US012470395B2

(12) United States Patent
Ott et al.

(10) Patent No.: US 12,470,395 B2
(45) Date of Patent: Nov. 11, 2025

(54) METHODS AND SYSTEMS FOR IDENTITY VERIFICATION USING VOICE AUTHENTICATION

(71) Applicant: Aegis-CC LLC, Los Angeles, CA (US)

(72) Inventors: Alexander Tai Ott, Los Angeles, CA (US); Gary Dean Ott, Los Angeles, CA (US)

(73) Assignee: Aegis-CC LLC, Los Angeles, CA (US)

( * ) Notice: Subject to any disclaimer, the term of this patent is extended or adjusted under 35 U.S.C. 154(b) by 100 days.

(21) Appl. No.: 18/439,548

(22) Filed: Feb. 12, 2024

(65) Prior Publication Data

US 2025/0030551 A1 Jan. 23, 2025

Related U.S. Application Data

(60) Provisional application No. 63/489,976, filed on Mar. 13, 2023.

(51) Int. Cl.
*H04L 9/08* (2006.01)
*H04L 9/32* (2006.01)

(52) U.S. Cl.
CPC .......... *H04L 9/3231* (2013.01); *H04L 9/0863* (2013.01); *H04L 9/3228* (2013.01)

(58) Field of Classification Search
CPC .... H04L 9/3231; H04L 9/0863; H04L 9/3228
(Continued)

(56) References Cited

U.S. PATENT DOCUMENTS 5,506,631 A * 4/1996 Boothe ................ A61B 5/4863
351/200
7,158,776 B1 * 1/2007 Estes .................... H04L 63/0892
455/410

(Continued)

FOREIGN PATENT DOCUMENTS

KR       102320921 B1    11/2021
WO    WO 2021037788       3/2021
(Continued)

OTHER PUBLICATIONS

Meunier et al., A video-based image processing system for the automatic implementation of the eye involuntary reflexes measurements involved in the Drug Recognition Expert (DRE), Mar. 31, 2008.

(Continued)

*Primary Examiner* — Thanh T Le
(74) *Attorney, Agent, or Firm* — Knobbe, Martens, Olson & Bear LLP

(57) ABSTRACT

During a voice authentication process, a code is transmitted to a first user electronic address. A determination is made as to whether the code was received from the first user and a second user within a threshold time period, and if so, the first and second users are enabled to record a consent verification script. Characteristics of the first user recording are compared with those of a first user reference voice recording to determine whether they are from the same person. Characteristics of the second user recording are compared with those of a second user reference voice recording to determine whether they are from the same person. In response to determining that the first recording and the first user reference voice recording are from the same person and that the second recording and the second user reference voice (Continued)

recording are from the same person a consent verification indication is generated.

21 Claims, 33 Drawing Sheets

(58) Field of Classification Search
USPC .......................................................... 713/186
See application file for complete search history.

(56) References Cited

U.S. PATENT DOCUMENTS

| | | | |
|---|---|---|---|
| 7,357,507 B2 | 4/2008 | Waldorf et al. | |
| 8,226,574 B2 | 7/2012 | Whillock et al. | |
| 8,783,869 B2 | 7/2014 | Harris et al. | |
| 8,899,748 B1* | 12/2014 | Migdal | A61B 5/004 351/210 |
| 9,002,067 B2* | 4/2015 | Siilats | G06T 7/20 382/107 |
| 9,042,615 B1* | 5/2015 | Bradley | G06T 7/0014 382/128 |
| 9,357,918 B1 | 6/2016 | Cohen | |
| 9,357,966 B1* | 6/2016 | Cohen | A61B 5/4845 |
| 9,380,958 B2 | 7/2016 | Harris et al. | |
| 9,475,387 B2* | 10/2016 | Wu | G06V 20/597 |
| 9,655,509 B2 | 5/2017 | Rotenstreich et al. | |
| 9,916,844 B2* | 3/2018 | Bae | G10L 25/66 |
| 9,934,544 B1* | 4/2018 | Whitfield | G06Q 50/265 |
| 10,390,802 B1* | 8/2019 | Picard | A61B 3/113 |
| 10,470,657 B1 | 11/2019 | Lister | |
| 10,761,084 B1* | 9/2020 | Lantz | G06Q 50/265 |
| 10,880,241 B2* | 12/2020 | Nigam | H04M 1/72424 |
| 11,013,441 B2 | 5/2021 | Samadani | |
| 11,406,262 B2* | 8/2022 | Zahrt | A61B 5/4863 |
| 11,426,107 B2* | 8/2022 | Gibbons | A61B 5/1114 |
| 2006/0286969 A1* | 12/2006 | Talmor | G06F 21/32 379/142.01 |
| 2006/0293891 A1* | 12/2006 | Pathuel | G06F 21/32 704/E17.003 |
| 2008/0091425 A1* | 4/2008 | Kane | G10L 17/04 704/270.1 |
| 2008/0192202 A1 | 8/2008 | Lewkowski | |
| 2009/0319274 A1* | 12/2009 | Gross | G10L 17/22 704/260 |
| 2010/0158207 A1* | 6/2010 | Dhawan | H04M 1/2478 379/88.02 |
| 2016/0379669 A1* | 12/2016 | Bae | A61B 5/4845 704/232 |
| 2017/0301353 A1* | 10/2017 | Mozer | G10L 17/02 |
| 2018/0047397 A1* | 2/2018 | Grover | G10L 17/06 |
| 2018/0333092 A1 | 11/2018 | Roshan et al. | |
| 2019/0189132 A1* | 6/2019 | Viswanathan | G10L 15/22 |
| 2020/0058086 A1* | 2/2020 | Carmichael | G06Q 50/18 |
| 2020/0184979 A1* | 6/2020 | Keret | G10L 25/51 |
| 2020/0193857 A1* | 6/2020 | Stephens | G06F 3/013 |
| 2020/0213253 A1* | 7/2020 | Nigam | H04L 51/222 |
| 2020/0351095 A1* | 11/2020 | Yadav | H04L 9/3239 |
| 2021/0125619 A1* | 4/2021 | López Espejo | H04L 63/0861 |
| 2021/0141896 A1* | 5/2021 | Streit | G06F 21/32 |
| 2021/0156864 A1 | 5/2021 | Osman et al. | |
| 2021/0173915 A1* | 6/2021 | Keith, Jr. | G06F 21/31 |
| 2021/0193151 A1* | 6/2021 | Song | G10L 17/06 |
| 2021/0390962 A1* | 12/2021 | Berkeland | G06Q 20/3272 |
| 2021/0393180 A1* | 12/2021 | Vallejo | A61B 5/6803 |
| 2022/0029981 A1* | 1/2022 | Mavani | H04L 63/0861 |
| 2022/0073079 A1* | 3/2022 | Nilsson | G06V 10/764 |
| 2022/0115023 A1* | 4/2022 | Cora | G06F 21/32 |
| 2022/0156864 A1* | 5/2022 | Furman | G06Q 50/265 |
| 2022/0211266 A1* | 7/2022 | Brewer | G06V 40/18 |
| 2022/0211310 A1* | 7/2022 | Zakariaie | A61B 5/163 |
| 2022/0354364 A1 | 11/2022 | Zahrt | |
| 2023/0107624 A1* | 4/2023 | Keith, Jr. | G06F 21/32 704/249 |
| 2023/0233120 A1* | 7/2023 | Fichtler | A61B 5/7264 600/301 |

FOREIGN PATENT DOCUMENTS

| | | | |
|---|---|---|---|
| WO | WO 2022084076 | | 4/2022 |
| WO | WO 2022212259 | | 10/2022 |
| WO | WO 2022256943 A1 | | 12/2022 |
| WO | WO 2023121929 | | 6/2023 |

OTHER PUBLICATIONS

Romano et al., Gaze-evoked nystagmus induced by alcohol intoxication, 26 pages, Jan. 17, 2017.

Simsek et al., "The Early Effects of Alcohol Consumption on Functional Visual Acuity, Tear Functions, and the Ocular Surface," Eye & Contact Lens, vol. 47, No. 1, Jan. 2021, 7 pages.

Strand et al., "Nystagmus Among Suspected Amphetamine Impaired Drivers," Journal of Forensic and Legal Medicine, vol. 95, No. 102502, (date: 2023), https://doi.org/10.1016/j.iflm.2023.102502, 3 pages.

Zielke et al., Using Design-Based Research to Develop a Virtual Human Interface for Police Nystagmus Training, Aug. 5, 2010.

PCT Search Report regarding International Application No. PCT/US2024/015605, mailed Jul. 22, 2024, 16 pages.

* cited by examiner

Record your sample

Record your voice sample when reading the following passage out loud.

TEXT PASSAGE

Eu eleifend massa egestas dictumst faucibus congue fringilla in.

Dolor aliquam est turpis ipsum faucibus bibendum fringilla.

Erat duis cursus quisque sapien vitae urna id.

0:00 / 0:10

Tap to start recording.

CONTINUE

Start Quiz

You're about to start quiz to assess your progress with the material from the current module.

10 Questions • No time limit

START QUIZ

CANCEL

FIG. 5E

Enter Code

Here you can enter the code that you received from your partner to access their profile, and document your consent.

AEGIS Code

[ Start typing... ]

[ CONTINUE ]

CLOSE

FIG. 5I

The example profile user interface illustrated in Figure 5H may be presented (e.g., in response to all users in the consent process submitting the consent code discussed above).

Enter Code

Here you can enter the code that you received from your partner to access their profile, and document your consent.

AEGIS Code

4895

CONTINUE

CLOSE

FIG. 5N

METHODS AND SYSTEMS FOR IDENTITY VERIFICATION USING VOICE AUTHENTICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to identity verification and in particular to identity verification using biometrics.

Description of the Related Art

Certain conventional user verification techniques, that utilize documents such as credit cards or driver's license to perform verification, are often unsatisfactory, as such documents are easy to counterfeit. Certain other conventional verification techniques utilize biometrics, such as facial recognition and fingerprint recognition. However, such conventional biometric verification techniques often fail to determine whether a given face is a copy (e.g., a mask of the face of the person being verified) or a fingerprint is a copy (e.g., where a person's fingerprint is collected and copied using a 3D-printed mold). A further disadvantage of certain conventional authentication techniques is that they fail to determine whether the provision of the user's physical characteristic for biometric verification is coerced or provided while the user is intellectually incapacitated (e.g., as a result of drug or alcohol use).

Thus, what is needed are technical solutions that overcome some or all of the foregoing disadvantages of conventional verification techniques.

Figure 1:
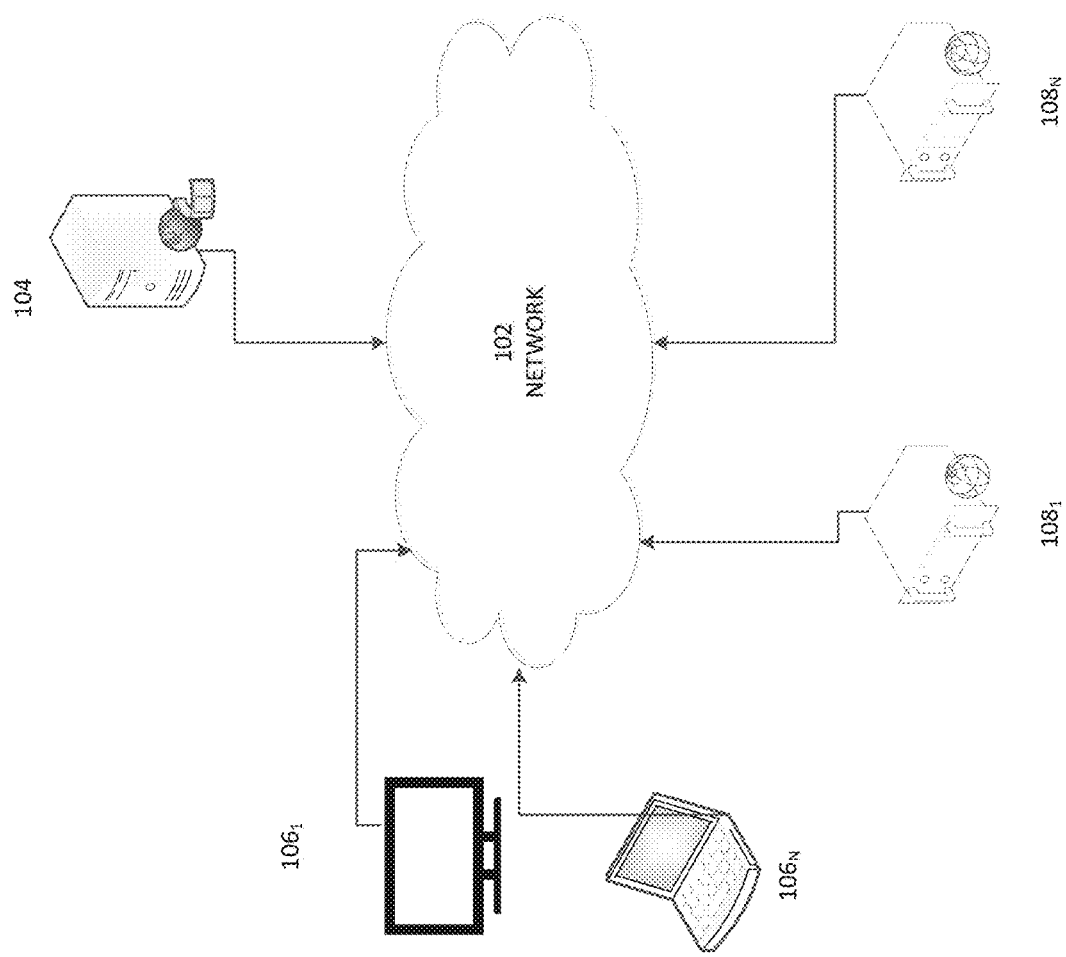
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Methods and systems are described that are configured to verify that an input from a person claiming a user identity is indeed the user. Such verification may optionally include multifactor authentication. Further, such verification may determine a likelihood that the As previously discussed herein, certain conventional user verification techniques, that utilize documents such as credit cards or driver's license to perform verification, are often unsatisfactory, as such documents are easy to counterfeit. Certain other conventional verification techniques utilize biometrics, such as facial recognition and fingerprint recognition. However, such conventional biometric verification techniques often fail to determine whether a given face or fingerprint is merely a copy provided by someone that is trying to fool the verification process. A further disadvantage of certain conventional authentication techniques is that they fail to determine whether the provision of the user's physical characteristic for biometric verification is coerced or not, or provided while the user is intellectually incapacitated (e.g., as a result of drug or alcohol use).

Aspects of the present disclosure are related to verification techniques that overcome some or all of the foregoing disadvantages of conventional verification techniques. An aspect of the present disclosure relates to receiving consent from a user with respect to a future action, and verifying that the consent actually comes from the user.

An aspect of the present disclosure relates to receiving consent from two (or more) users from respective user devices with respect to a future action between the two users, verifying that the consent actually came from each of the two (or more) users, and determining a likelihood that the consent was voluntarily given and/or was given while the user lacked the intellectual capacity (e.g., as a result of intoxication resulting from drug or alcohol user) to provide such consent. Such consent may be recorded and such recordation may be encrypted to enhance security and privacy.

Certain example aspects will now be discussed with reference to the figures. FIG. 1 illustrates an example environment. A verification system 104 (which may include a consent verification component, a voice analysis component, a geolocation component, a content distribution component, a test component, and/or a communication component) is connected to a network 102 (e.g., a wide area network, the Internet, a local area network, or other network). The verification system 104 is configured to communicate with client devices $106_1 \ldots 106_n$ (e.g., smartphones, laptops, desktops, game consoles, connected televisions, streaming devices that connect to televisions or computers, networked wearables, etc. associated with respective users). A client device 106 (which may be referred to herein as a user device) may host a browser (which may be used to access, from a remote server, and render user interfaces and data described herein, and to enable a user to provide data and instructions) and/or a consent application (e.g., an "app" downloaded from an application ("app") store that provides functionality described herein). The verification system 104 may provide and/or populate user interfaces, such as those described herein.

The system 104 may store user records, where a given user record (e.g., an account record) may include some or all of the following data: a user name, age, email address, physical address, phone number, texting address, educational institution the user is currently attending, profile data (e.g., gender, sexuality, sexual partner preferences, age, educational institution the user is currently attending, and/or other user information, which may be provided by the user), records of consent processes successfully conducted with other users (optionally including consent video recordings, as described herein), records of consent processes unsuccessfully conducted with other users, indications to whether the user is currently prohibited from using the system 104 and/or certain system functionality (e.g., the consent functionality), a record of consent related courses the user has consumed (e.g., viewed and/or heard), a record of consent related tests the user has completed and related scores, and/or other user-related data described herein). Some or all of the user record may be encrypted and access may be limited to certain authorized administrators to enhance security and privacy.

The system 104 may be configured to stream and/or download educational video content to devices 106 as described herein. As described herein, the verification system 104 may enable users, via client devices 106, to record mutual consent to various activities with each other, and to perform voice analysis to ensure that consent is voluntary and that a user is not intellectually or mentally incapacitated. The verification system 104 may optionally be configured to provide educational content regarding such activities, test users on their comprehension of the educational content, and/or enable users to quickly access resources, such as security and counseling services by way of example.

The verification system 104 may receive recordings (e.g., video recordings with an audio track, or audio track only) from client devices 106. For example, as will be described herein, a user may, via a consent application hosted on a client device 106, make a recording of the user reading a predefined script (which may include locations where the user is to insert non-scripted language, such as the user's name), wherein the script corresponds to the type of consent the user is giving. The verification system 104 may also receive geolocation data from the client device 106 (e.g., satellite positioning data, such as GPS data, that may indicate the user's latitude, longitude, and optionally, altitude; Wi-Fi geolocation data, cell tower triangulation geolocation data and/or the like). Such geolocation data may optionally be utilized by the consent process as described elsewhere herein, and in providing emergency and/or other services to the user at the client device location.

Optionally, the verification system 104 may transmit information or route communications to one or more institutional systems $108_1 \ldots 108_n$. The verification system 104 may also receive information or communications from one or more institutional systems $108_1 \ldots 108_n$. For example, the institutional systems $108_1 \ldots 108_n$ may optionally include educational institution servers, servers of police or other security institutions, and/or the like. Where the institutional systems $108_1 \ldots 108_n$ are associated with an educational institution, the institutional systems $108_1 \ldots 108_n$ may transmit student related information to the verification system 104 (e.g., student names, student ID number, student email address, and/or the like). The verification system 104 may transmit a notification of a student-related emergency event to a corresponding institutional system 108. For example, if during a consent process the verification system 104 determines that a user that is providing consent appears to lack the intellectual capacity to provide such consent (e.g., by performing a voice analysis on a voice input from the user and determining a threshold likelihood of an estimated state of intoxication to the extent that the user lacks the intellectual capacity to provide such consent), the verification system 104 may transmit a corresponding notification to an educational institution and/or to an electronic campus security address (e.g., phone number, email address, and/or the like) or system.

Thus, certain aspects of the present disclosure, including processes described herein, may be performed in varying degree, by the verification system 104, a given client device 106, and/or a given institutional system 108.

Figure 2A:
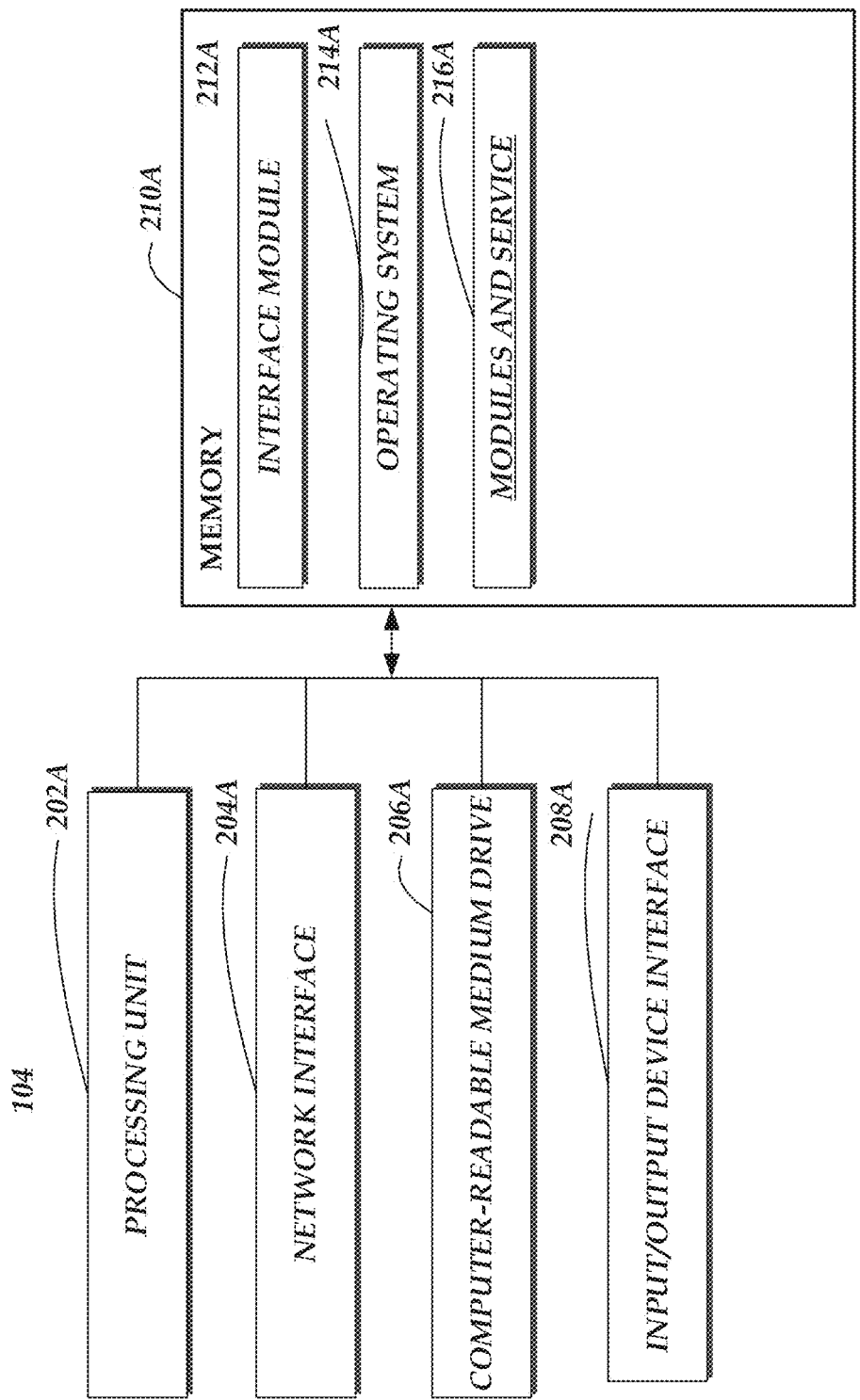
FIG. 2A is a block diagram illustrating example components of a verification system.

FIG. 2A is a block diagram illustrating example components of a verification system 104. The example verification system 104 includes an arrangement of computer hardware and software components that may be used to implement aspects of the present disclosure. Those skilled in the art will appreciate that the example components may include more (or fewer) components than those depicted in FIG. 2A. The verification system 104 may optionally be a cloud-based system including a hosted computing environment that includes a collection of physical computing resources that may be remotely accessible and may be rapidly provisioned as needed. Further, the verification system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and/or content described herein.

The verification system 104 may include one or more processing units 202A (e.g., a general-purpose processor, an encryption processor, a video transcoder, and/or a high-speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., institutional systems, client devices, etc.). The processing unit 202A may thus receive information, content, and/or instructions (such as described herein) from other computing devices, systems, or services via a network, and may provide information, content (e.g., streaming video content, content item previews, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

Figure 2B:
FIG. 2B illustrates example modules and services of the verification system.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general-purpose processor and may optionally include a video codec.

The system 104 may offload certain compute-intensive portions of the modules and services 216A (e.g., Fast Fourier Transforms (FFTS) as may be used to generate power spectrums for the voice analysis processes described herein, encryption, decryption, and/or the like) to one or more dedicated devices, such as a signal processing device, while other code may run on a general-purpose processor. The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, and/or the like, configured to facilitate data transmission to and from data stores, user terminals, and third-party systems via one or more networks. Accordingly, the depictions of the modules are illustrative in nature.

The modules and services 216A may include modules and components that provide a consent verification service 202B, a voice analysis service 204B, a nystagmus analysis service 212B, a pupil analysis service 214B, a blink rate analysis service 216B, a smoothness tracking service 218B, gaze tracking service 220B, a feature identification service 222B, a geolocation service 206B, a content distribution service 208B, a test service 210B, and/or a communication service 212B.

The consent verification service 202B may receive and process requests for consent verification, as described herein. The voice analysis service 204B may be utilized by the consent verification service 202B to verify, via voice analysis, that a user is who the user claims to be. For example, in response to a consent verification voice recording from a user that purports to be a certain specific user, the consent verification service 202B may utilize the voice analysis service 204B to compare, using respective voice templates, a voice sample previously recorded by the certain specific user with a new voice sample from the user to determine if both voice samples are from the same person. If the voice samples are not from the same person, the consent verification service 202B may terminate the consent process. The consent verification service 202B may optionally utilize the voice analysis service 204B to determine if the user is intellectually capable of providing consent. For example, the voice analysis service 204B may analyze a voice recording of the user reading a consent script to determine if there is, and the degree of word slurring, mumbling and/or other characteristics of intoxication. The degree of word slurring, mumbling and/or other characteristics of intoxication may be scored, and if the score exceeds a specified threshold, a determination may be made that the user is not intellectually capable of providing consent.

The nystagmus analysis service 212B may optionally also be utilized by the consent verification service 202B to determine if the user is intellectually capable of providing consent. For example, as described elsewhere herein, nystagmus refers to an inability to adequately control eye movements, which may be evidence of intoxication. The nystagmus analysis service 212B may be utilized to determine if a person is suffering from nystagmus, and hence may be under the influence of an intoxicating substance and is intellectually incapable of providing consent.

The pupil analysis service 214B may optionally also be utilized by the consent verification service 202B to determine if the user is intellectually capable of providing consent. For example, alcohol can influence the size of a person's pupils due to its impact on the nervous system. As described elsewhere herein, the pupil size may be analyzed to determine if the user is under the influence of an intoxicating substance and is intellectually incapable of providing consent.

The blink rate analysis service 216B may optionally also be utilized by the consent verification service 202B to determine if the user is intellectually capable of providing consent. For example, alcohol can influence a person's blink rate as described elsewhere herein. As described elsewhere herein, the person's blink rate may be analyzed to determine if the user is under the influence of an intoxicating substance and is intellectually incapable of providing consent.

The smoothness tracking service 218B may be utilized to detect if the person is smoothly moving a camera equipped device while using the device to capture images of the person's face (and the eyes in particular) in order to perform certain analysis described herein. In response to detecting that the device is not being smoothly moved (which may result in a degraded and possibly erroneous analysis), a notification may be provided to the person to move the device more smoothly. In addition, optionally, the determined smoothness of the movement may be utilized to determine if the user is under the influence of an intoxicating substance and is intellectually incapable of providing consent.

The gaze tracking service 220B may be utilized to detect if the person's eyes (gaze) are tracking a camera equipped device while using the device to capture images of the person's face (and the eyes in particular) in order to perform certain analysis described herein. In response to detecting that the person is not tracking the device with their gaze, a notification may be provided to the person to track the device with their gaze. In addition, optionally, the determined gaze tracking may be utilized to determine if the user is under the influence of an intoxicating substance and is intellectually incapable of providing consent.

The feature identification service 222B may be utilized to detect facial features (e.g., facial landmarks, such as eyes) that may be utilized to perform certain analysis and make certain determinations described herein.

If a determination is made that that the user is not intellectually capable of providing consent, a consent failure process may be performed, and optionally a corresponding notification may be provided to the user and/or to the prospective partner, and/or to one or more other destinations (e.g., a security entity, a counseling center, an education institution, etc.). Optionally, a user may need to opt-in (e.g., during an account creation process or thereafter) to have such notifications provided to prospective partners and/or other destinations.

The geolocation service 206B may be utilized to route security and/or other services to a user's geolocation (as reported by a user device or otherwise) and described herein.

Optionally, the content distribution service 208B may select items of content, such as educational content (e.g., video, audio, text content) related to providing and receiving consent for sexual activities from a library of such content to be presented via a user interface on a user device 106. As similarly discussed elsewhere herein, such content may be selected based on what educational content the user has already viewed, what scores a user received on corresponding tests, and/or the like. Optionally, a user interface may be populated with representations of educational content from which a user may select, and the educational content may be streamed, downloaded, or otherwise transmitted to the user device.

The content library navigation service 206B may receive and process user content library navigation commands, such as drill-up, drill-down, scroll left, scroll right, go back to a preview user interface, go to home screen, play, add to watchlist, and/or other navigation commands provided via corresponding user interface controls. The content library navigation service 206B may communicate with the content library selection service 204B (e.g., communicate user navigation commands), enabling the content library selection service 204B to accordingly populate a library navigation user interface (e.g., such as that illustrated in FIGS. 3A and 3B) with corresponding representations of content items.

The test service 210B may be utilized to select, provide, and score the tests described herein (e.g., providing a measure as to how successfully the user consumed/comprehended certain educational material). The communication service 212B may be utilized to route communications to or from a user (e.g., to another user, to a security service, to a counseling service, to an educational institution, and/or other destination), such as described herein.

Figure 2C:
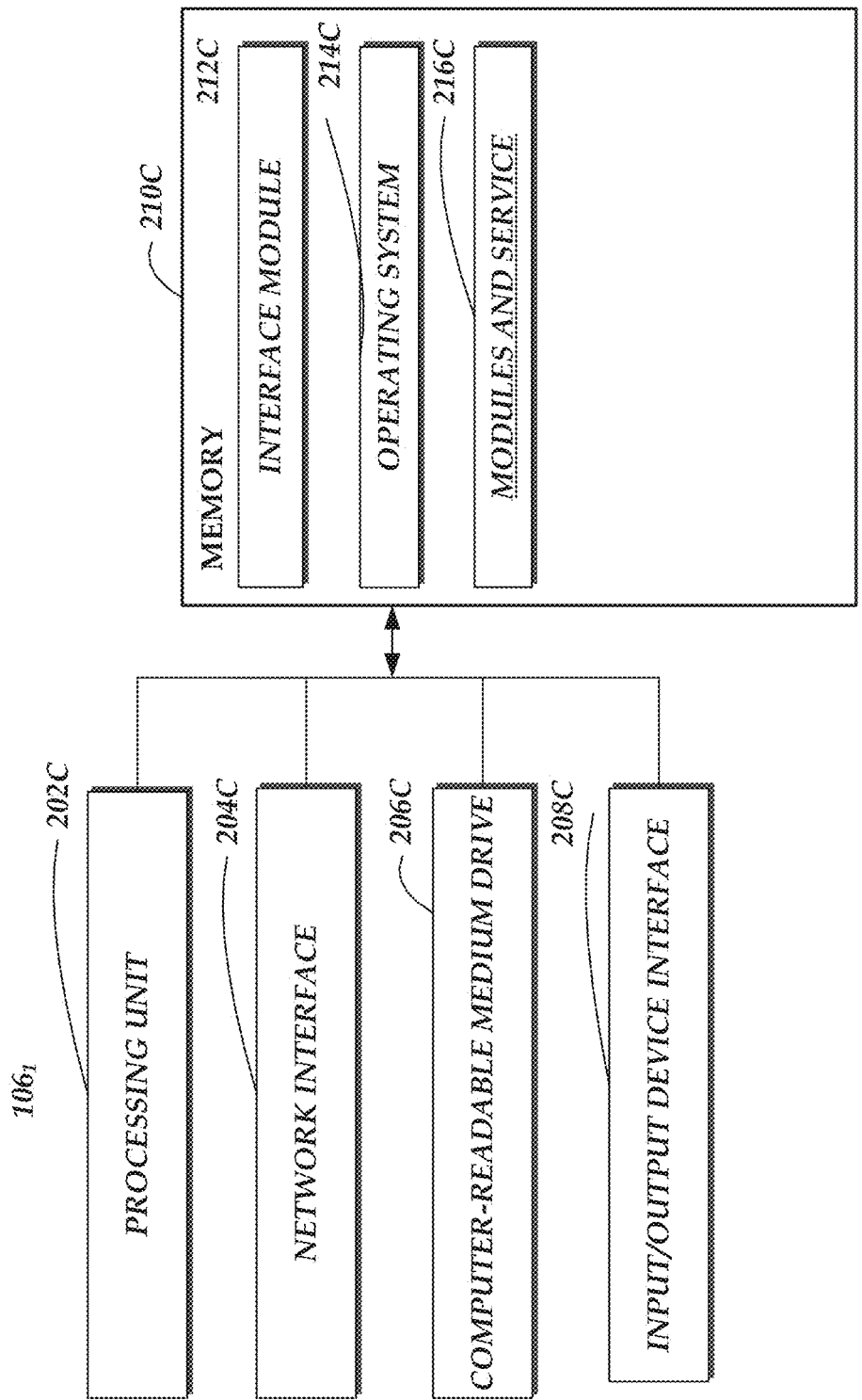
FIG. 2C is a block diagram illustrating example components of a user device.

FIG. 2C is a block diagram illustrating example components of a user device 106 e.g., smartphone, laptop computer, desktop computer, game console, connected television, networked wearable, or other networkable computing device). The example user device 106 includes an arrangement of computer hardware and software components that may be used to implement aspects of the present disclosure. Those skilled in the art will appreciate that the example components may include more (or fewer) components than those depicted in FIG. 2C.

The user device 106 may include one or more processing units 202C (e.g., a general-purpose processor, an encryption processor, a video transcoder, and/or a high-speed graphics processor), one or more network interfaces 204C, a non-transitory computer-readable medium drive 206C, and an input/output device interface 208C, all of which may communicate with one another by way of one or more communication buses. The network interface 204C may provide the various services described herein with connectivity to one or more networks or computing systems, such as the verification system 104, the institutional systems $108_1 \ldots 108_n$, and/or other systems. The processing unit 202C may thus receive information, content, and instructions from other computing devices, systems, or services via a network and may transmit information, content, and instructions to other computing devices, systems, or services via a network. The processing unit 202C may also communicate to and from non-transitory computer-readable medium drive 206C and memory 210C and further provide output information via the input/output device interface 208C. The input/output device interface 208C may also accept input from various input devices (which may be integral to the user device 106 or remote from the user device 106), such as a keyboard, buttons, knobs, sliders, remote control, mouse, digital pen, touch screen, microphone (e.g., to receive voice commands, a reading of a script, etc.), cameras, light intensity sensors, etc.

The memory 210C may contain computer program instructions that the processing unit 202C may execute in order to implement one or more aspects of the present disclosure. The memory 210C generally includes RAM, ROM and/or other persistent or non-transitory computer-readable storage media. The memory 210C may store an operating system 214C that provides computer program instructions for use by the processing unit 202C in the general administration and operation of the modules and services 216C, including its components. The memory 210C may comprise local memory and cloud storage. The memory 210C may further include other information for implementing aspects of the present disclosure.

The memory 210C may include an interface module 212C. The interface module 212C can be configured to facilitate generating and/or populating one or more interfaces through which a compatible computing device may send to, or receive from, the modules and services 216C. The user device 106 may optionally host a browser and/or a consent application downloaded from an app store or otherwise loaded, which may be used to render user interfaces described herein, receive user inputs (e.g., instructions, text, menu selections, video/audio recordings, such as voice samples for identity verification and/or for a consent process), and provide other services and functionality described herein.

Certain aspects will now be further discussed.

As previously discussed, an aspect of the present disclosure relates to receiving consent from two (or more) users from respective user devices with respect to a future action (e.g., a sexual interaction) between the two users, verifying that the consent actually came from each of the two (or more) users, and determining a likelihood that the consent was voluntarily given and/or competently given (e.g., given by someone with the intellectual capacity to provide consent). Such consent may be recorded (e.g., where the consent may comprise activation of a consent control, providing textual consent, and/or a video/audio or audio-only recording of a user reading a consent script as described herein), and such recordation may be encrypted to enhance security.

Optionally, in order for a user to access and utilize the disclosed verification system, a user may need to be associated with an entity, such as an educational institution (e.g., a college or university). For example, optionally a key (e.g., a unique alphanumeric code or other token) may be provided to the entity which may in turn provide the key to a given user (e.g., a student). The key may be a time limited key, where the key is valid for a specified amount of time (e.g., 20 minutes, 60 minutes, 1 day, 2 days, or other time frame). Optionally, in addition or instead, the time limited key may be transmitted directly by the verification system to a user address (e.g., an email address, a telephone/SMS address) provided to the verification system by the institution (e.g., via an institution system), or provided by the user via a user interface presented via a browser or a dedicated application (e.g., a consent application providing some or all of the functionality described herein) hosted on a user device (e.g., a smartphone, tablet computer, a laptop computer, a desktop computer, a connected television, a wearable, or other networked electronic device, where a user device may include a display, touch screen, microphone, speaker, keyboard, other user input devices, other output devices, and/or the like).

The user may then submit the key to the verification system via a user interface presented via a web browser or a dedicated application (e.g., a consent application) hosted on the user device. Upon receipt of the key, the verification system may determine whether or not the key is a valid key, and if so, whether or not the key has expired. Optionally, if it is determined that the key has expired, the user may be prompted to request a new key by activating a link or other control. A control may optionally be provided via which the user can edit or provide a new address to which a new key is to be sent.

If the verification system determines that the key is valid and has not expired, the verification system may cause a user interface to be presented via which the user can establish a user account. For example, the user interface may enable the user to specify a password for the account, where the user may be requested to enter the password twice to verify that the user has entered the intended password. Optionally, the password may need to meet certain criteria (e.g., may need to be a minimum length, may need to have both lowercase and uppercase letters, may need to include special characters (e.g., punctuation marks), may need to have one or more numbers, and/or the like). If the user has correctly entered the password and the password has been determined to satisfy the password criteria, the password may be associated with the user account. The user may then use the password (optionally in combination with other authentication data, such as an email, phone number, fingerprint authentication data, faceprint authentication data, voiceprint authentication data, and/or the like) to access the user account (e.g., via a sign-in user interface). Optionally, in addition to or instead of a password, a passkey, made up of a cryptographic key pair, may be used to gain access to a user account and/or to utilize services described herein.

Optionally, in order to set up a user account, a user interface may be provided via the user device, prompting the user to enter and/or confirm certain user data. Such user data may include an email address, a phone number (e.g., a cellular phone number associated with a messaging application, such as an SMS or other chat application), a new password, an institutional (e.g., college) name, and/or one or more physical addresses (e.g., the user's residential address while at college, the user's home address when not at college, and/or the like).

The user may also be prompted to view and/or agree to certain terms of use and privacy policies. By way of further example, the user may be prompted to provide the user's first and last names, date of birth, gender (e.g., male, female, non-binary), and/or sexuality (e.g., gay, lesbian, heterosexual, bisexual, pansexual, asexual, etc.). Optionally, the user may indicate, via the user interface, what user information (e.g., gender, sexuality, etc.) is to be posted on a user profile viewable by other users. The user interface may also enable the user to enter freeform profile data, such as a description of the user that may be shown to another user engaging in a consent process with the user.

Once the user's account is established, the user may be prompted to consume certain course material (e.g., relating to the importance of obtaining express consent from a person prior to engaging in sexual relations with that person, and/or other related matters). Optionally, the user needs to complete the course material (e.g., presented by the verification system via a user device browser and/or presented by consent application user interface), as determined by the system, in order to access and utilize certain verification services, such as the consent verification services described herein. Optionally, a user may be required to take a test on such course material and achieve a minimum score (e.g., answer a certain number or percentages of questions correctly) as determined by the verification system before the verification system grants the user access to certain verification services. If the user score failed to satisfy the minimum score, the user may be prompted to review the course and/or take the test again. Optionally, the process may be repeated until and unless the user passes the course test.

In addition, optionally in order for the user to gain access to and/or utilize the verification system consent functionality, the user may be prompted, via a corresponding user interface, to provide reference physical characteristic data (e.g., voice data) to be used in biometric verification. As will be described, the use of voice biometric data may advantageously consume less network bandwidth, less processing resources, and provide enhanced insight to the user willingness or capability of providing consent to certain actions as compared to other forms of biometric verification, such as facial recognition and image processing of images of the user.

Figure 3A:
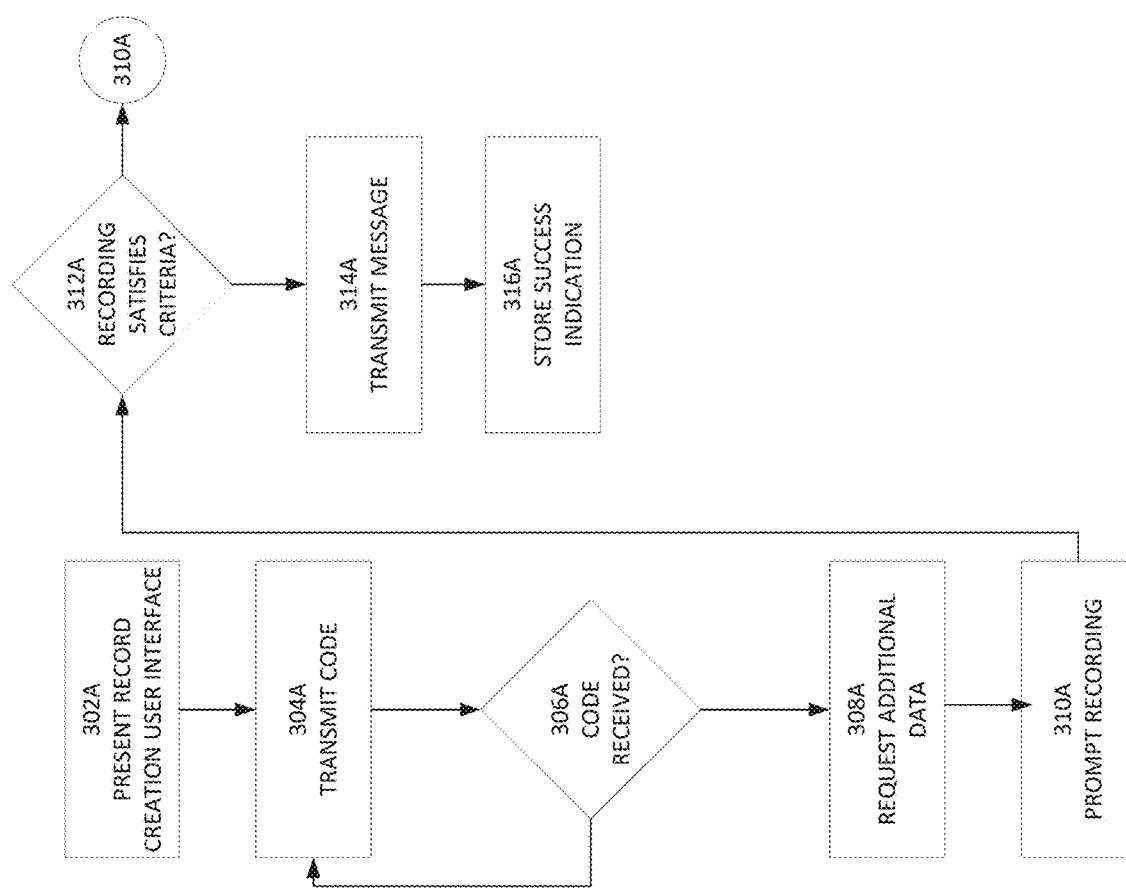
FIGS. 3A-3B illustrate processes.

FIG. 3A illustrates an example user account record generation process configured to generate an account record for use in conjunction with the consent process and other functions described herein.

At block 302A, an account record creation user interface may be provided via a user device (e.g., via a consent application hosted on the user device or via a browser accessing the user interface from a remote server, such as a server associated with the verification system described herein). The user interface (which may comprise one or more screens) may prompt the user to provide certain user related information, such as name, email address, mobile phone/messaging number/address, and/or an identification of an institution (e.g., an education institution). The user information may be received by the verification system from the user device.

At block 304A, a verification code may then be transmitted to the user (e.g., to the phone number/messaging address or email provided by the user). The verification code may be utilized to verify that the user owns/has control over the phone number/messaging address or email provided by the user. The code may optionally be time limited to a certain time period and optionally, a countdown timer may be displayed via the user interface to the user, where the user is instructed to enter the verification code into a verification code field once the user receives the verification code.

At block 306A, a determination is made as to whether the verification code was received by the user within the permitted time period. If not, the user may be inhibited from continuing in the account creation process and the user may be prompted to request a new verification code. If the user requests a new verification code, the process may repeat block 304A. Optionally, to avoid hacking or other improper action, the user may only be permitted to request a verification code a specified number of times. If a verification code is not successfully received from the user within a threshold time period, the process may terminate.

If a determination is made, at block 306A, that the verification code was received within the permitted term period, additional user information or other data may be requested via a corresponding user interface. For example, if not already provided at block 302A, some or all of the following information may be requested: a username, age, email address, physical address, phone number, texting address, educational institution the user is currently attending, and/or other profile data (e.g., gender, sexuality, sexual partner preferences, age, educational institution the user is currently attending, and/or other user information).

At block 308A, a user interface may be provided via the user device prompting the user to record (e.g., a video recording with an audio track or an audio only recording) the user to read a script (e.g., a script providing consent to a sexual engagement with potential partner) that will be used as a baseline for modeling the user's voice and speech patterns. The recording of the user reading the script may be used in the future for authenticating the user and/or to determine whether the user is mentally/intellectually competent to provide consent to engage with certain acts (e.g., sexual acts) with another user. The recording may be performed, by way of example, by a front-facing camera and a microphone of the user device. At block 310A, the recording may be received (via an uploaded file or via streaming) from the user device. At block 312A, a determination may be made (e.g., by the verification system) as to whether the recording meets certain criteria. For example, the process may determine whether the loudness or power spectrum of the audio is above a certain threshold for a minimum threshold of time. By way of further example, the process may determine the length of the recording as a whole, without analyzing loudness or the audio power spectrum, to thereby reduce the amount of computer resources that would otherwise be needed to perform such analysis.

If a determination is made that the sound recording does not meet the specified criteria, at block 314A, the verification system may transmit a message to the user device prompting the user (e.g., via the consent application or webpage) to re-record the user reading the script, and the process may repeat. Optionally, a user may be given a limited number of attempts to provide the sound recording, and if the user's unsuccessful attempts reach the limited number, the user may be prevented from making further attempts without contacting support service s (and may be prevented from utilizing the consent and/or other services described herein, and/or the user may be prevented from further attempts for a specified period of time.

If a determination is made that the sound recording does meet the specified criteria, at block 316A, a corresponding indication may be stored in the user's record, and the user may be enabled to access certain features described herein, such as the consent verification process.

Figure 3B:
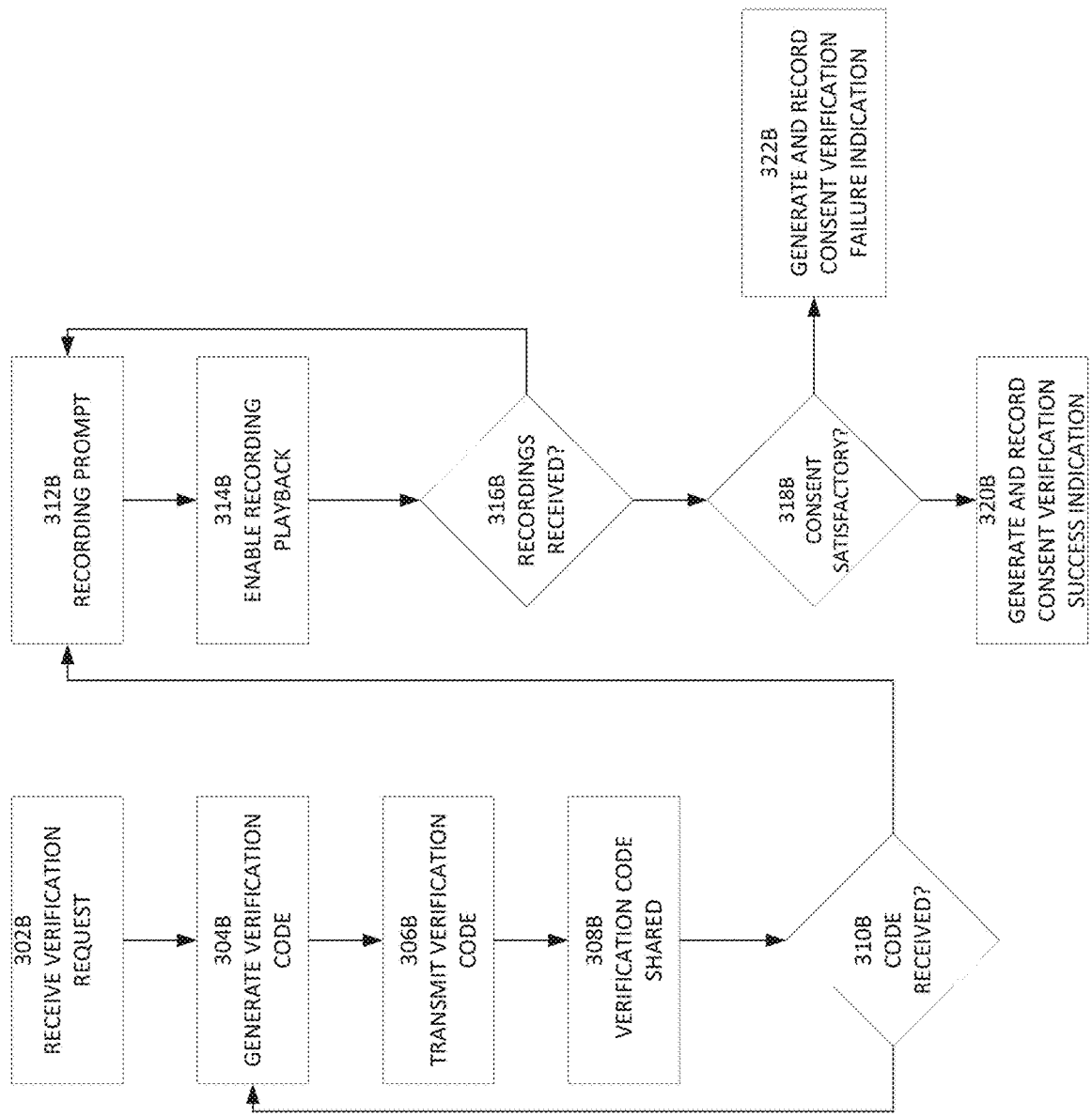

Referring to FIG. 3B, an example consent process is illustrated. At block 302B, a user consent verification request is received from a user device associated with a first user. At block 304B, a unique verification code is generated. At block 306B, the unique verification code is transmitted to the user device and presented to the user (e.g., via a consent verification consent application or a webpage). At block 308B, the first user may share the verification code with a second user, where the second user is a potential partner (e.g., sexual partner) for the first user. By way of example, the first user may share the verification code with the second user via email, a messaging service, the consent verification application, and/or otherwise.

At block 310B, a determination is made as to whether the consent verification code has been received from both the first user and the second user within a specified period of time. For example, the first user and the second user may submit the consent verification code via a verification code receiving field presented on the first user device or the second user device, where the verification code receiving field may be presented via a consent verification application hosted on the first user device and/or the second user device, or the verification code receiving field may be presented via a webpage rendered via a web browser hosted on the first user device and/or the second user device. If the consent verification code is not received from the first user and the second user within the specified time period, the process may prompt the first user to request and share a new consent verification code, and the sharing process may repeat.

If the consent verification code is received from the first user and the second user within the specified time period, at block 312B, the first user and the second user may be individually prompted to record themselves reading a script (e.g., a script providing consent to a sexual engagement with potential partner) while recording themselves (e.g., via a front-facing camera of a smartphone or via a webcam). Optionally, the script may be presented over the video image of a given user while the given user is recording themselves reading the script. Optionally, the same script may be provided to both the first user and the second user, where the first user may insert the first user's name at a specified point in the script, and the second user may insert the second user's name at a specified point in the script. Optionally, the script of the first user and the script of the second user may be materially different.

Optionally, in addition, the geolocations of the first user and the second user (e.g., as determined from geolocation information received from respective device of the first user and the second user) may be used to determine whether the distance between the first user and the second user is within a specified threshold distance, and if the distance is not within the specified threshold distance, a process exception notification may be generated (e.g., a consent verification failure notification), which may be transmitted to the first user and the second user, and a corresponding indication may be stored in memory. The foregoing use of geolocation data may be a further check on a user spoofing another user, where if the distance between two users is too great it is unlikely that there will be sexual activity between the two in the immediate future.

At block 314B, a given user may be enabled to review their recording (playback their recording) of reading the script, and the given user may be prompted to upload the video. If the given user is not satisfied with the recording, the given user may re-record the reading of the script by activating a record control.

At block 316B, a determination is made as to whether an upload of the script-reading video has been received from the first user device and from the second user device. Optionally, the uploads from both the first user and the second user need to be received within a corresponding threshold period of time. If the uploads from both the first user and the second user are not received within a corresponding threshold period of time, one or both of the users may be prompted to record the script-reading video, or some or all of the entire process may repeat.

If the uploads from both the first user and the second user are received within a corresponding threshold period of time, at block 318B the recordings may be analyzed to determine if they are from the purported users and a determination may be made as to whether each of the users is intellectually capable of providing consent. For example, as similarly discussed elsewhere herein, a given recording of a purported user (e.g., a template generated from the given recording) may be compared to an enrollment recording of the user (e.g., a template generated from the enrollment recording) to determine if they match. If they do not match, at block 322B, an exception action may be triggered. The exception action may include generating a notification to the first user, the second user, and/or an administrator, and generating a consent process failure indication that may be stored in memory.

By way of illustration, the voice sample may be digitized by the user device and transmitted over a network to the verification system. The verification system may convert the digitized voice sample (e.g., as a waveform) into a unique digital voiceprint or an enrollment template associated with the user.

This digital voiceprint may include relatively small units of each of the spoken words and the word segments of the voice sample. The digital voiceprint may also include tone variations, tenor, and other parameters, such as physiological components. The voiceprint may be utilized by a voice recognition process to authenticate the user (e.g., by comparing a template generated from the enrollment voice recording with a template generated from the voice recording of the purported user reading the consent script). Advantageously, the use of a voiceprint for verification and other purposes described herein, consumes relatively less computer and network resources while performing enhanced functionality as compared to conventional face recognition systems. The voice authentication process may be text independent or text dependent (where the user may be requested to use certain of the same phrases in both the enrollment process and the voice authentication process.

With respect to the physiological components, the voiceprint may be utilized by the verification system in recreating the shape of the user's vocal tract. As no two persons have the same vocal tract shape, a unique voice imprint for every individual can be created.

Optionally, in addition, the unique voice imprint includes the pace of the speech, mannerism, and pronunciation associated with the voice sample, and such data may optionally be utilized to identify the user's voice in the future and/or to detect whether the user is inebriated or otherwise incapable of providing informed consent.

In addition, if the identity of the first user has been verified, optionally a determination may be made as to whether each user is intellectually competent to provide consent to the proposed action. For example, a voice analysis service may analyze a voice recording of the user reading a consent script to determine if there is, and the degree of, word slurring, mumbling, certain guttural utterances, and/or other characteristics of intoxication.

Optionally, a waveform of glottal pulses estimated from speech may be generated by applying Iterative Adaptive Inverse Filtering (IAIF) to the voice recording. Using the waveform, certain glottal excitations may be detected that indicate evidence of alcohol intoxication over a certain threshold. By way of further example, the voice analysis service may extract low-level acoustic features (e.g. mel-frequency cepstrum) from the voice recording, and n-way direct classification or regression using maximum margin classifiers may be applied to determine a state of intoxication. By way of further example, speed, pitch, tone and emphasis on certain syllables may be detected and may then be compared to known features that present emotions, depression or alcohol intoxication. Optionally, machine learning algorithms such as HMM (Hidden Markov Model), GMM (Gaussian Mixture Model), SVM (Support Vector Machines), or k-NN (k-nearest neighbors algorithm) and deep learning models such as CNN (Convolutional Neural Network) and RNN (Recurrent Neural Network) may be utilized in performing voice analysis. If a determination is made that the user is not competent to provide consent (e.g., the user is too intoxicated to give consent or is too depressed), or a determination is made that the consent was provided under coercion, at block 322B, an exception action may be triggered. The exception action may include generating a notification to the first user, the second user, a security person, and/or an administrator (e.g., indicating that the user is attempting to consent to a sexual act, but appears to be coerced, intoxicated, and/or depressed), and generating a consent process failure indication that may be stored in memory.

At block 320B, if the identities of the first and second users were successfully verified, and if a determination was made that the user had the intellectual capacity to provide consent and/or that consent was not involuntarily provided, the consent may be verified, and such verification may be stored in a record of the first user and a record of the second user. Optionally, a notification of the successful consent verification may be transmitted to and presented by the first user device and the second user device. Optionally, the first user may be enabled to view the script-reading recording of the second user, and the second user may be enabled to view the script-reading recording of the first user.

Figure 4A:
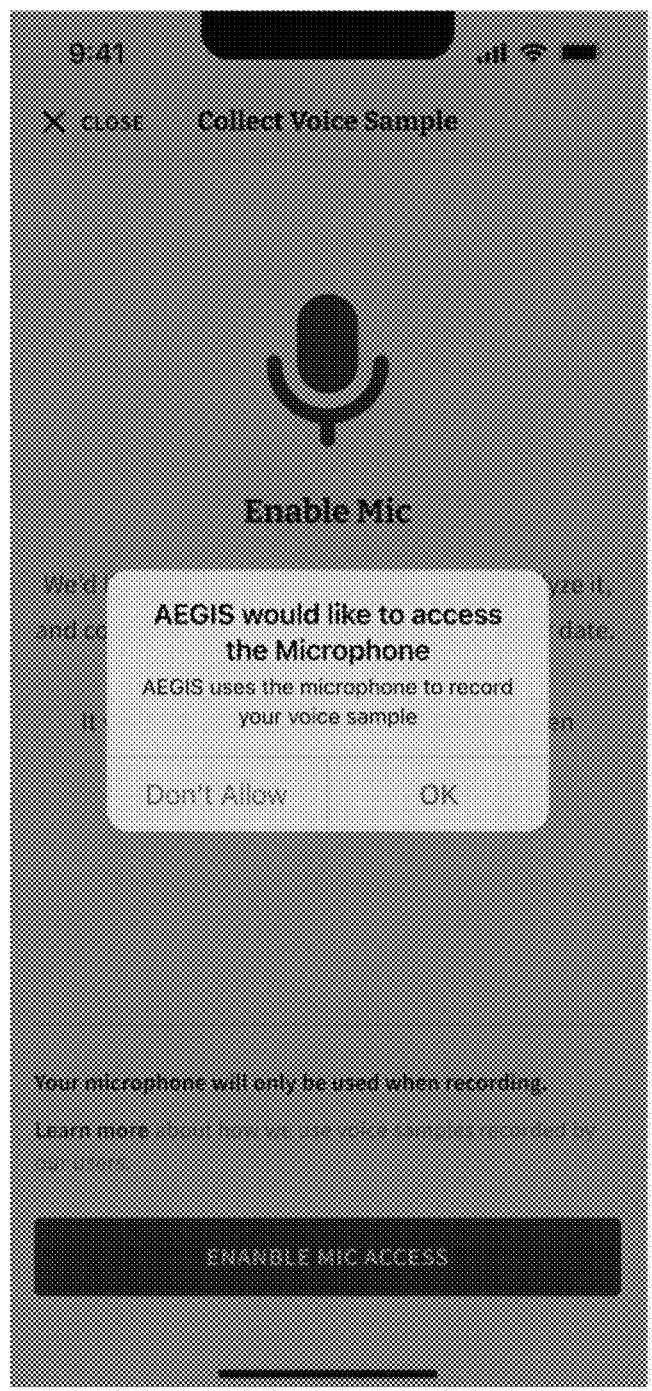
FIGS. 4A-5N illustrate example user interfaces.
Figure 4B:
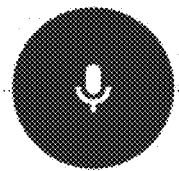

Certain example user interfaces will now be described. With reference to FIG. 4A, an example user interface may prompt the user to provide a voice sample of the user's voice as part of the enrollment process for voice authentication. By way of further example, the consent application may request the user device's operating system to request permission from the user to access input from the user device's microphone and optionally camera so that a voice sample (and optionally a video face sample) may be obtained from the user. Referring to FIG. 4B, a user interface may prompt the user to activate a record control and to read a script as part of the enrollment process. The enrollment script may be the same as the script later used during a voice authentication process (e.g., to enhance accuracy and reduce computer resource utilization), may include certain of the same phrases (e.g., one or more voice passphrases of 2-5 words in length), or may be completely different than the script later used during a voice authentication process (e.g., a text independent authentication process). The script may include example consent language. A countdown timer may be provided to help guide the user's pace in reading the script.

Figure 4C:
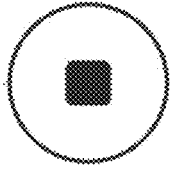

As illustrated in FIG. 4C, the record control may alter appearance during the actual recording process (e.g., a microphone symbol may be provided which when selected begins the reading process, at which point the microphone system may be changed to another symbol, such as a square or other symbol that denotes recording) so that the user is aware that the recording is in process. Optionally, a textual and/or graphical notification may be displayed and/or an alert lighting element illuminated indicating that the recording is underway. A progress bar may be displayed and constantly updated during the recording, depicting how much of the recording time has been utilized (where a maximum recording time may be specified to reduce network utilization and video/audio processing resource utilization). The recording may be paused or completed in response to one or more events, such as the user selecting the recording indicator, in response to the countdown timer reaching a threshold (e.g., zero), detecting more than a threshold period of silence, and/or otherwise. A preview control may be provided, which, when activated, causes the consent application to playback the recording. A control may be provided that enables the user to re-record the same. Once the user is satisfied, the user may activate a submit voice recording control.

The verification system may analyze the voice sample to make sure it is long enough (e.g., meets a threshold length, such as 15 seconds, 20 seconds, 30 seconds, or other amount of time) and/or clear enough (e.g., has at least a specified threshold loudness level and/or power spectrum, was capable of being converted to text, etc.). If the voice sample is not long enough or clear enough, the verification system may cause a user interface to be presented to the user that prompts the user to re-record the voice sample.

The verification may perform liveness detection to ensure that the voice is not simply a playback of a recorded voice. For example, a liveness detection may detect a spectral power of the voice that is indicative of a voice replayed through a speaker (comprising a transducer).

The user may also be requested via a user interface for permission to track the user's geolocation (e.g., track the user's device's geolocation via GPS or other location provided by the user's device to the verification system) and/or to share such geolocation data with one or more specified entities (e.g., security services, counseling services, education institution of the user, and/or other entity). If the user grants permission to track (and optionally share) the user's geo-location, the verification system may use the geolocation as part of the verification process. For example, if the user indicates that the user would like to submit a request for recording of consent, the system may determine whether the requesting user and the potential partner user are within a threshold physical distance (e.g., within 25 miles, 100 miles, 300 miles, or other threshold distance) and if not, the verification system may infer that the requesting user is a bad actor and the verification system may inhibit the verification and consent process.

Figure 4D:
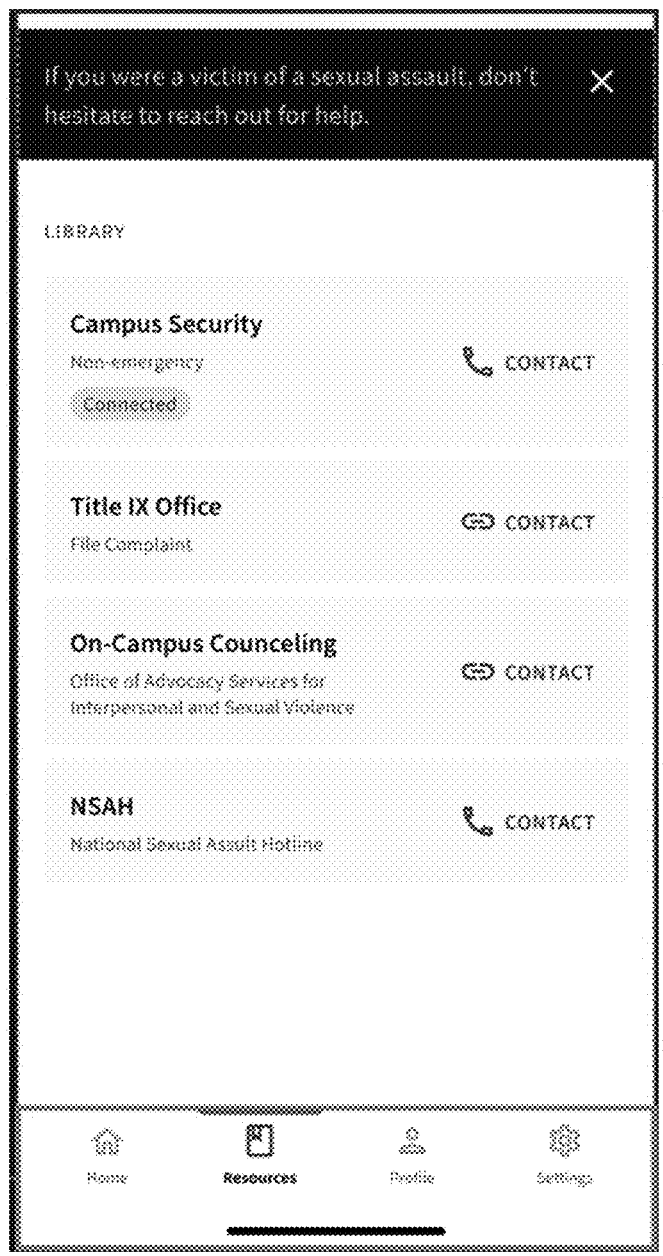

In addition, if a user initiates a security request via the security contact control illustrated in FIG. 4D (e.g., for a campus police officer or other person to escort the user home or other location to enhance user safety), the system may generate instructions to route the security person closest to the user to the user's location or may transmit the user's location to a security system which will dispatch a security person to the user's location. The user interface illustrated may enable the user to access other resources, such as counseling resources, Title IX resources, a sexual assault hotline, and the like by activating a corresponding control which may initiate a corresponding communication (e.g., a phone call, a text message, an email, and/or the like).

Figure 5A:
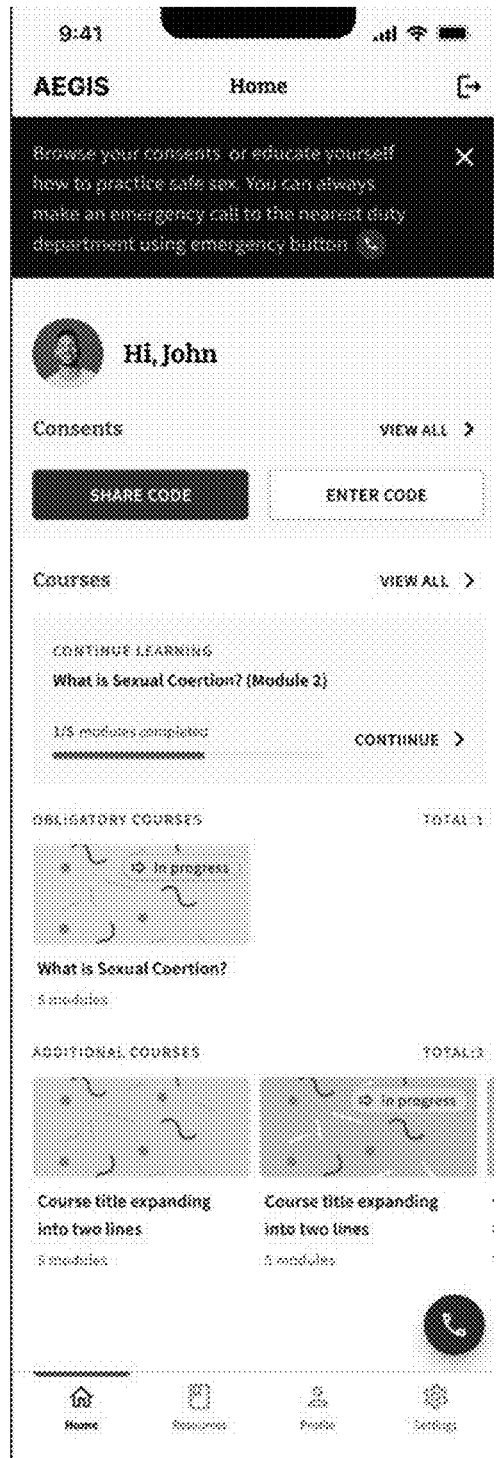

Once the user account has been set up and the voice sample has been recorded, the user may access other user interfaces via a home screen used in FIG. 5A and utilize a consent process executed via the verification system. The home screen may be accessed from a consent application hosted on the user device or from a website via a browser hosted on the user device. The home screen may include the user's name.

For example, and with reference to the example home screen illustrated in FIG. 5A, when two (or more) users want to establish that they are providing consent to an interaction involving the users (e.g., a sexual interaction), one of the users may activate a send code control. In response to activation of the send code control, a unique code may be sent to all the users that are going to be involved in the interaction. Optionally instead, the code may be sent to the requesting user who in turn may send the code to the prospective sexual partner. The users may then enter the code (which may be referred to as a pairing code) to be paired or joined as a group. Optionally, the pairing code is only valid for a specified period of time and if the pairing code is not entered within the specified time period it will no longer be valid and the user will need to request and enter a new pairing code.

Figure 5B:
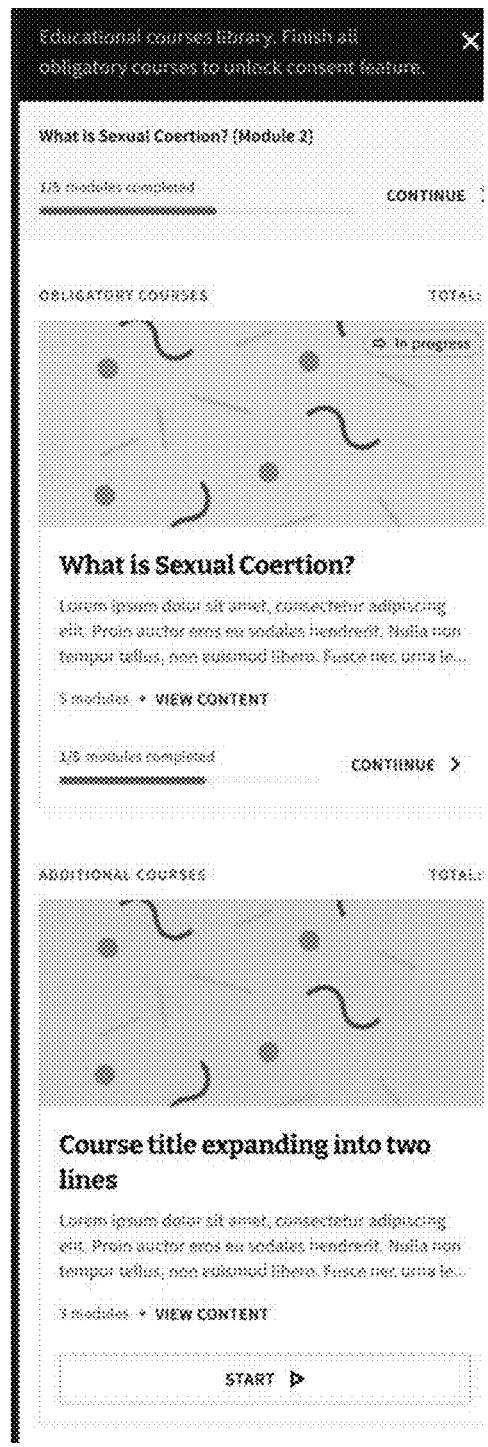

FIG. 5B illustrates an example home screen display which may be accessed from a consent application hosted on the user device or from a website via a browser hosted on the user device. The home screen may include the user's name, a list of available courses (where the courses may comprise video (including an audio track), audio only, text, and/or graphics), an estimated time to complete the course, and optionally an indication as to which courses the user has or has not completed. If a course includes multiple modules, the user interface may indicate how many modules of the course the user has completed and how many modules the user still needs to complete.

Figure 5C:
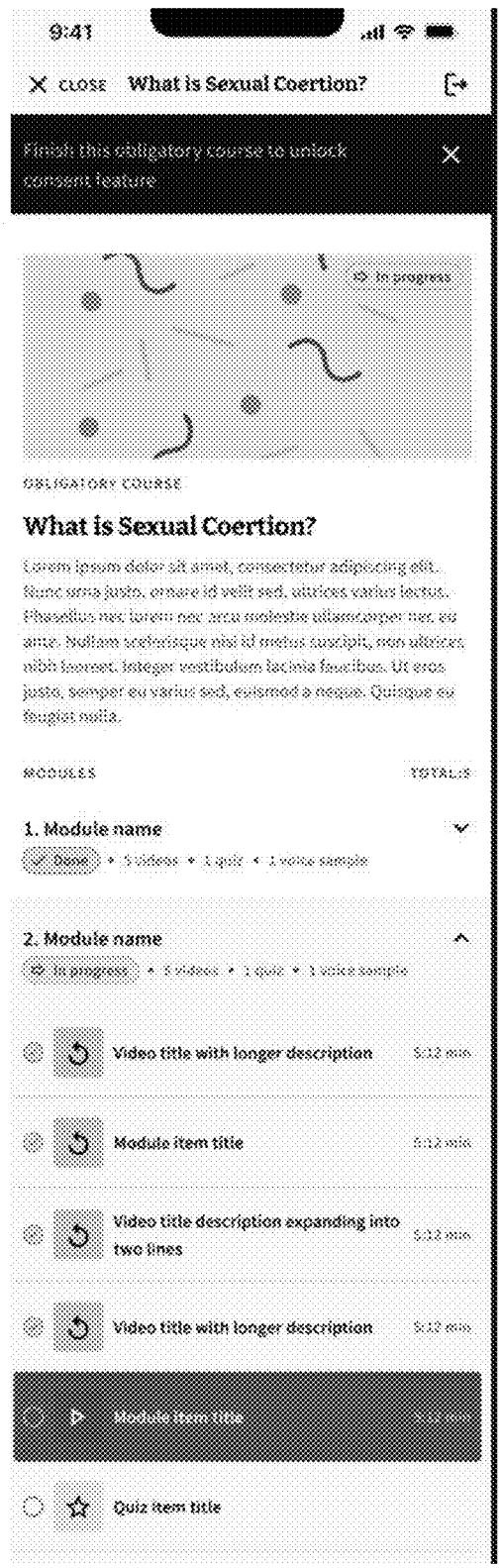

If the user selects a course a course, a user interface may be displayed (see, e.g., FIG. 5C), providing additional detail recording the course and listing the current course module that the user is to complete and additional course modules (e.g., including respective module names, descriptions, and time lengths) from which the user may select. The user interface may indicate which course modules the user has completed and which course modules the user has not completed. For a module that the user has completed, a control may be provided via which the user can repeat (e.g., replay) the course. A voice recording control may be provided in order to receive a voice sample. In addition, a test control may be provided via which the user may access a test (e.g., a quiz) for the current module.

Figure 5D:
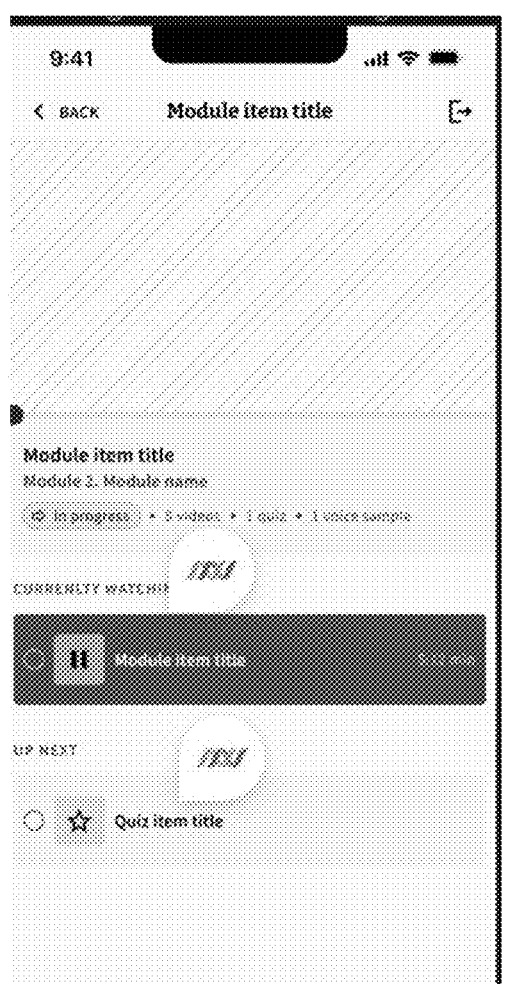

In response to the user selecting a course module, the example user interface illustrated in FIG. 5D may be presented. The example user interface includes a video/presentation playback area with an associated progress bar (indicating how much of the module video has been played, a title, a course time length, the number of videos in the module, the number of voice samples in the modules, and the number of module quizzes. A control may be provided via which the user may access a module quiz.

Figure 5F:
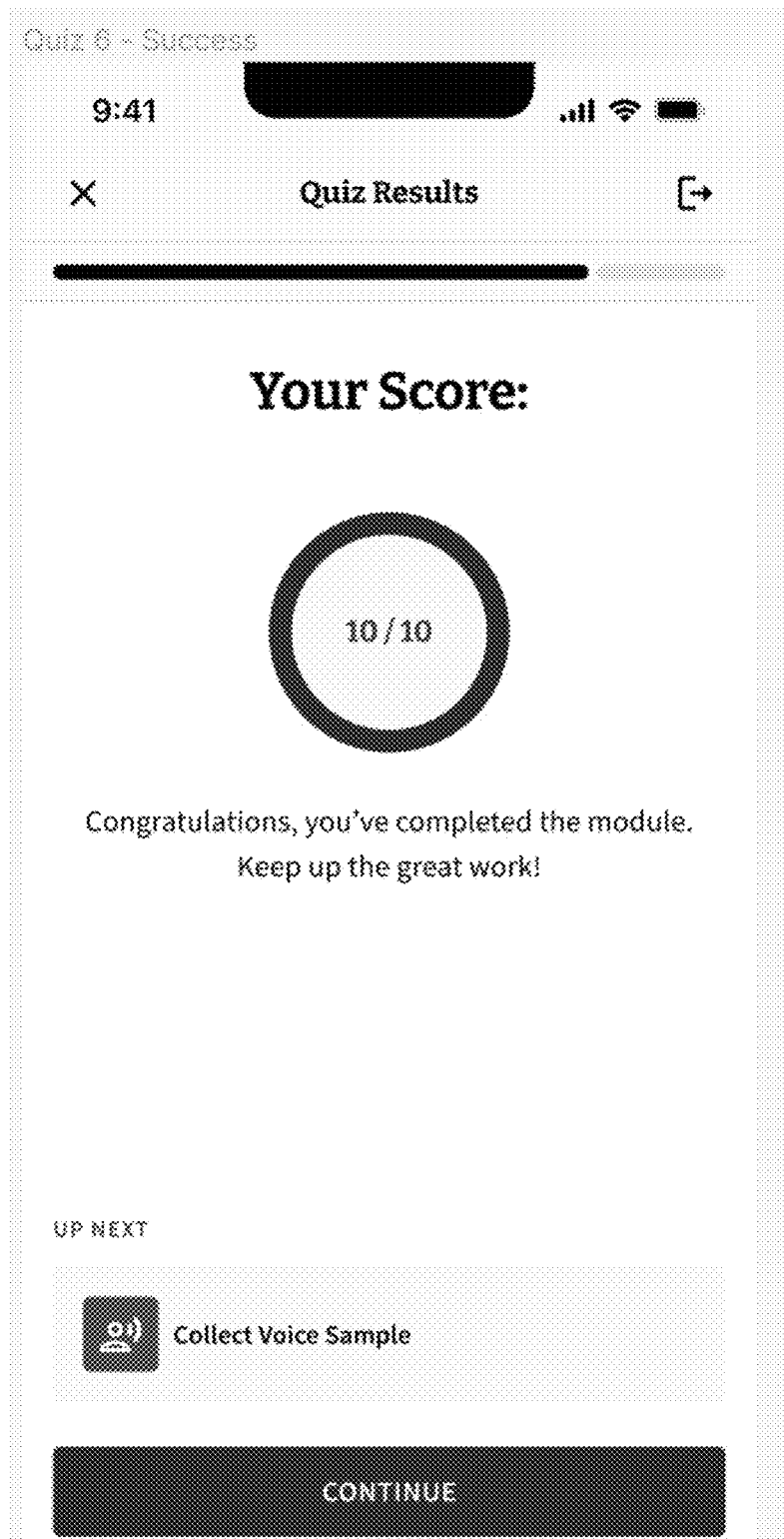

FIG. 5E illustrates an example module quiz user interface that may indicate the quiz subject matter, the number of questions in the quiz, and the time limit (if any) to complete the quiz. A start quiz control is provided which, when activated, initiates the quiz. The quiz user interface may provide multiple choice questions, fill-in-the-blank questions, true-or-false questions, free text questions, and/or other questions types. Optionally a control may be provided via which the user may exit the quiz without completing the quiz so that the quiz results are not recorded. If the user completes the quiz, the user's answers may be recorded in association with the user's record, the quiz may be graded, and the grade may be presented to the user (see, e.g., the example user interface illustrated in FIG. 5F) and recorded in the user's record. If the user has successfully completed (e.g., achieved the minimum threshold score) each course module, a course completion certificate may be recorded in the user record, sent to the user, and/or sent to the institution.

Figure 5G:
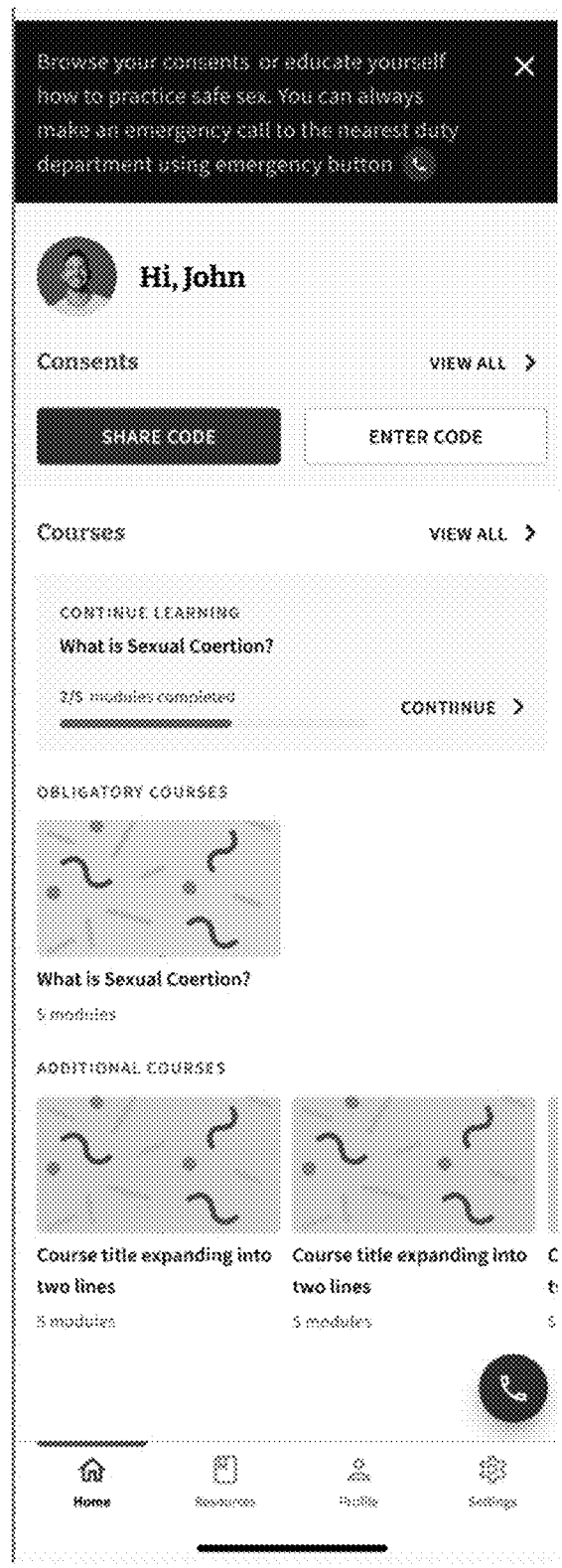

Referring to FIG. 5G, as similarly discussed above, when two (or more) users want to establish that they want to provide recorded consent prior to an interaction involving the users (e.g., a sexual interaction), one of the users may activate a send code control. In response to activation of the send code control, a unique code may be sent to all the users that are going to be involved in the interaction. Optionally instead, the code may be sent to the requesting user who in turn may send the code to the prospective sexual partner (e.g., via text messaging, email, the consent application, or otherwise). The users may then enter the code (which may be referred to as a pairing code) to be paired or joined as a group. A user may select another user to whom the code is to be sent to from the user's contact database, by entering the other user's phone number or email address, by accessing an institution contact database, or otherwise.

Figure 5H:

FIG. 5H illustrates an example code presentation user interface that presents the code to a user (who may then share it with a prospective partner via the consent application, a messaging service, email, or otherwise). A countdown timer may be presented indicating that time remaining in which the code will be valid for use in the consent process. FIG. 5I illustrates an example code entry user interface with a code entry field configured to receive the code from the user.

Figure 5J:
Figure 5K:
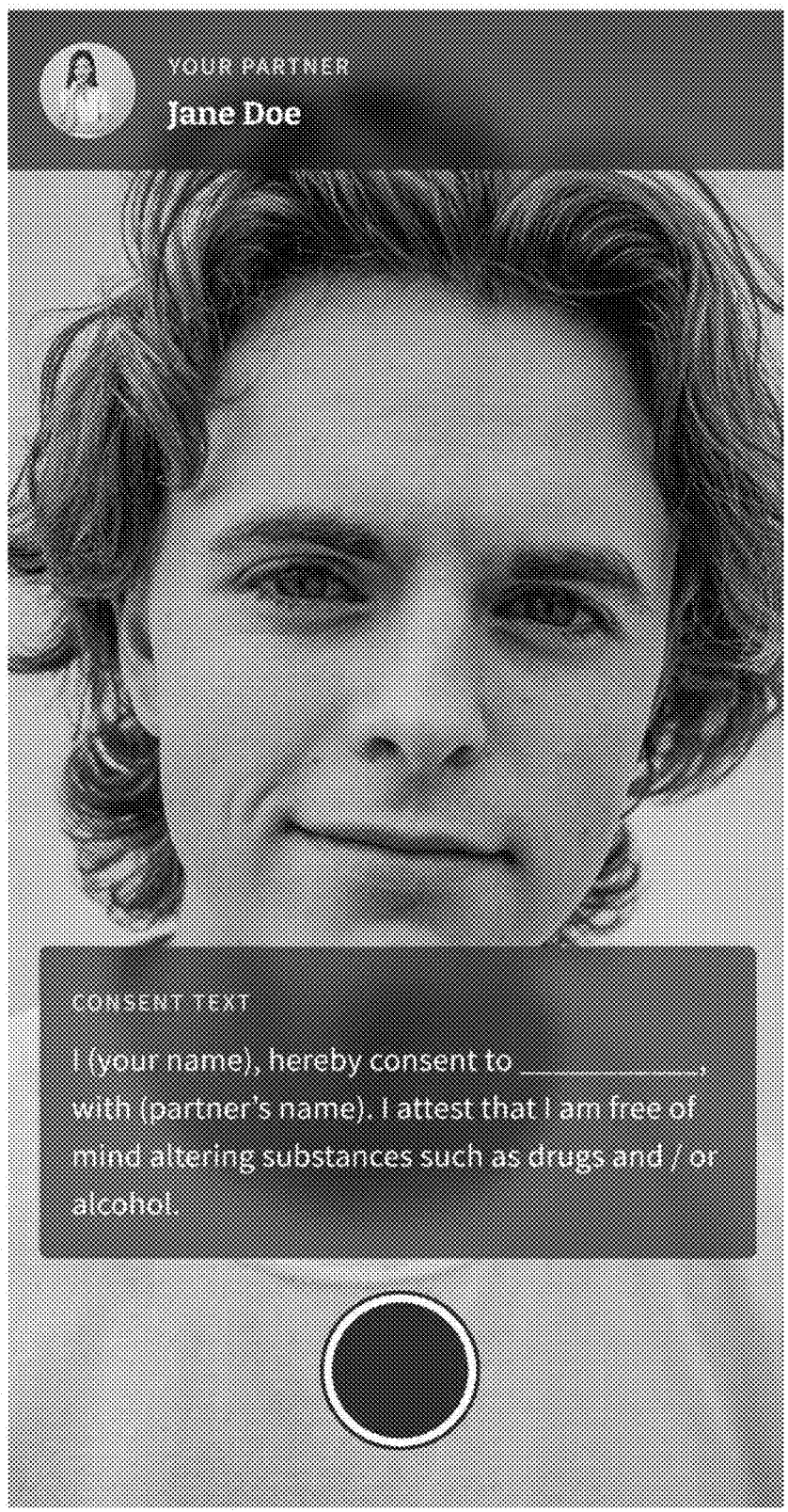

The example profile user interface illustrated in FIG. 5J may be presented (e.g., in response to a consent request and/or to all users in the consent process submitting the consent code discussed above). The profile of the other user is presented to the user. The profile may include an image of the other user, the other user's defined gender, the other user's defined sexuality, a textual self-description by the other user, and/or other profile information. A record consent control (which may be a circle or other shape) may be provided. In response to the user activating the record consent control, the example user interface illustrated in FIG. 5K may be presented. The user interface may include a photograph of the other user, the name of the other user, an image of the user being recorded by a front-facing camera on the user's device, a consent script that the user is to read as part of the consent process (which may optionally overlay the image of the user being recorded by a front-facing camera or which may be displayed under, over, or to one side of the image), and a record control.

Figure 5L:
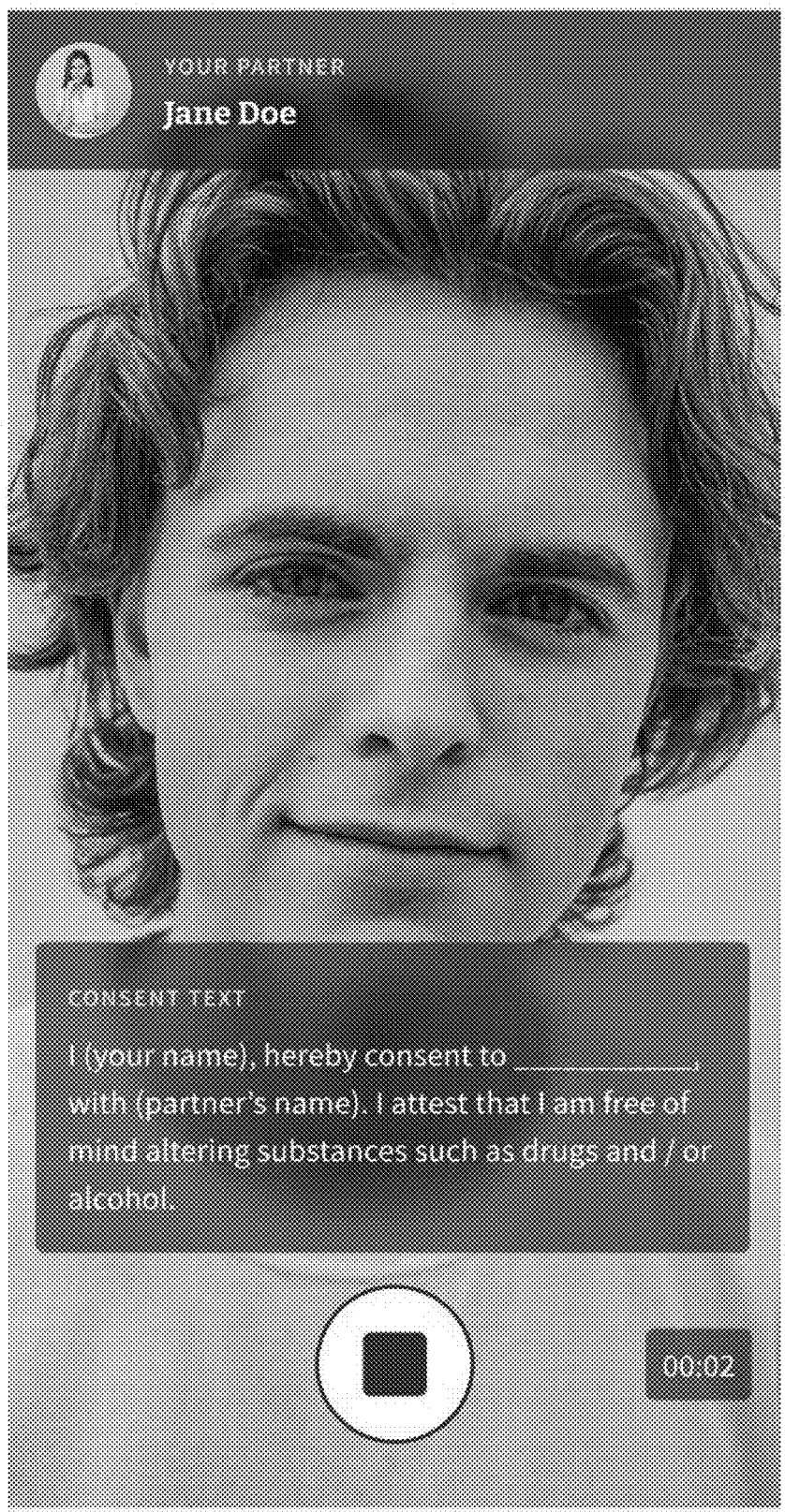
Figure 5M:
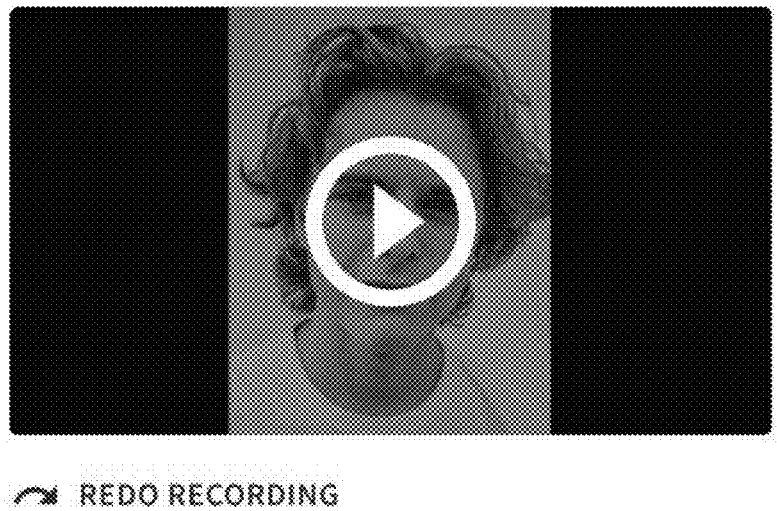

In response to the user activating the record control, a video of the user reading the consent script captured by the front-facing camera of the user device is recorded, as illustrated in FIG. 5L. In addition, as illustrated in FIG. 5L, the record control may be changed (e.g., from a circle to a square) to indicate the recording is in process. In addition, a timer and/or a progress bar may be depicted indicating the recording time length. Once the user has completed recording the user reading of the consent language, the example user interface illustrated in FIG. 5M may be presented. The user interface illustrated in FIG. 5M enables the user to playback and view the recording of the user reading the consent script. In addition, a re-record control is provided, which when activated enables the user to repeat the recording process. Optionally, the recording may be at least temporarily stored on the user's device. An upload control is provided which when activated causes the recorded consent video to be uploaded over the network to the remote verification system. Optionally, the consent application may delete the video recording from the user's device after the upload has taken place in order to conserve memory resources of the user device.

The prospective partner may then be prompted to enter the pairing code, as illustrated via the interface depicted in FIG. 5N. If the prospective partner correctly enters the code within the specified time period (if any), the prospective partner may be prompted to record a consent script as similarly described above with respect to the requesting user.

As described herein, a determination may be made as to whether a user (who may be referred to as a subject) lacks the intellectual capacity to provide a valid consent (e.g., to a sexual act) via user device. For example, as described elsewhere herein, such a determination may be made by performing a voice analysis on a voice input from the subject and determining a threshold likelihood of an estimated state of intoxication (e.g., alcohol or drug intoxication) to the extent that the user lacks the intellectual capacity to provide such valid consent. In addition or instead, an analysis of a subject's eye motions and/or pupils may be performed to determine an estimated state of intoxication to thereby determine the extent to which the subject lacks the intellectual capacity to provide such valid consent. In addition or instead, a subject's blink rate may be performed to determine an estimated state of intoxication to the extent that the user lacks the intellectual capacity to provide such valid consent.

Optionally, eye tracking may be performed by a mobile device of the subject using an infrared camera, a flood illuminator, a depth sensor, and/or a dot projector to create a detailed 3D depth map of the subject's face, which enables the device to recognize facial features, including the eyes. As discussed herein, such data may be used to track the movement and orientation of the user's eyes. By analyzing changes in the position and orientation of the eyes, the mobile device can determine where the user is looking. The mobile device and/or the application installed thereon may utilize machine learning and computer vision algorithms to process the data from sensors and cameras, detect and analyze facial features, including the eyes, and track eye movement in real-time.

Different weightings may be applied to a determination based on a voice analysis, an eye motion analysis, a pupil analysis, and/or a blink rate analysis in determining whether or not a person has or lacks the intellectual capacity to provide such consent to certain activities (e.g., sexual activities). By optionally using two or more techniques disclosed herein in determining whether or not a person has or lacks the intellectual capacity to provide such valid consent, a more accurate and reliable determination may be made, thereby enhancing safety and reducing false positive determinations.

For example, an optional intoxication formula that may be used to calculate the likelihood that the subject is unable to provide informed, legal, valid consent is as follows:

$$\text{Likelihood subject is intoxicated } (LSI) = \\ 1/N \ (W_1 D_1 + W_2 D_2 + W_3 D_3 + W_4 D_4 \ \ldots \ W_n D_n)$$

where:
N=Normalization factor
W=Weight
$D_1$=intoxication determination based on voice analysis
$D_2$=intoxication determination based on eye motion analysis (e.g., horizontal nystagmus, smooth tracking)
$D_3$=intoxication determination based on pupil size/diameter analysis
$D_4$=intoxication determination based on eye blink rate analysis
$D_n$=intoxication determination based on other determinations (e.g., smoothness of movement of the subject's device during testing, ability to focus gaze on the subject's device during testing, and/or other determinations)

Certain determinations will now be discussed in greater detail.

Eye movements are controlled by the brain. For example, when a person rotates their head while looking at an object, the brain causes the eyes to automatically move to stabilize the viewed object and to thereby provide a sharper image of the object. When a person is intoxicated (e.g., acute alcohol intoxication, or intoxication caused by certain drugs, such as phencyclidine, opiates, cannabis, or barbiturates), the cerebellar function is affected so that the brain cannot control eye movements properly. For example, a person may exhibit involuntary and rhythmic movement of the eyes. Such failure to adequately control eye movements is referred to as nystagmus. The failure to adequately control horizontal eye movements is referred to as horizontal nystagmus.

For example, horizontal gaze nystagmus detection of a subject may be performed by having the subject hold a mobile device (e.g., a smart phone) at eye level while stationary. The subject may be instructed (e.g., via an audible instruction and/or textual generated via application on the mobile device) to fully extend the arm of the hand holding the mobile device and to position the mobile device at the edge of the subject's vision (e.g., to the far left or far right of the subject's head at eye level). The screen of the mobile device may be brightly illuminated or may have an image displayed thereon by the application that the subject is instructed to track with their eyes. The subject may be instructed to gradually and smoothly move the mobile device towards the center of the subject's gaze (e.g., directly in front of and centered on the subject' face), repeating this process for both sides of the subject's head (e.g., so that the movement process takes about 2-4 seconds on each side), with the mobile device held in one hand for one side, and the other hand for the other side.

For example, the subject may first move the mobile device, while holding the device in the left hand, from the far left of the subject's head toward and to the center of the subject's gaze, while tracking the mobile device display with their eyes. The subject may then be instructed to move the mobile device, while holding the device in the right hand, gradually and smoothly from the far right of the subject's head toward and to the center of the subject's gaze, while tracking the mobile device display with their eyes. The forward facing camera (on the same side of the device as the display) may capture images of the subject's eyes during the foregoing movements. The application, hosted on the mobile device (such as the application discussed herein) and/or mobile device hardware may analyze the images of the eye movements of the subject's eyes (e.g., by tracking the movement of the subject's pupils), and based on the analysis of the eye movements, determine whether the subject is or the likelihood that the subject is under the influence of a substance that prevents the subject from having sufficient intellectual capacity to consent to certain acts.

With respect to determining whether the subject's eyes are tracking the subject's device, face detection, facial landmark detection, and tracking of eye movements may be performed in real time. For example, as similarly discussed elsewhere herein, a face detection algorithm (e.g., Haar cascades, Histogram of Oriented Gradients (HOG), and/or deep learning-based models) may be utilized to identify and locate the subject's face in the camera frame. Such techniques are described in greater detail herein. For example, facial landmark detection may be utilized to identify certain landmarks on the face, such as the corner of eyes. Optionally, a region-based convolutional neural network (R-CNN) may be utilized to detect eyes in the image. The movement of the identified eyes may be tracked over time by analyzing the positions of the detected facial landmarks corresponding to the eyes in consecutive frames. Optionally, optical flow techniques can be employed to estimate the motion (direction and speed) of pixels between frames, allowing the tracking of eye movements.

By way of example, differential methods (e.g., the Lucas-Kanade method) may be used to compute optical flow by analyzing intensity gradients in the image. In addition or instead, correlation-based methods may be utilized that identify the best matching region in the next frame for each pixel in the current frame. In addition or instead, deep learning, convolutional neural networks (CNNs) may be utilized to directly learn optical flow from image sequences.

Optionally, gaze estimation models may be utilized to predict the direction in which the subject is looking. A gaze estimation model may take into account the position of the eyes, head orientation, and/or other factors. Deep learning-based models, such as CNNs and/or recurrent neural networks (RNNs), may be trained for and used for gaze determination.

Optionally, in response to detecting that the subject's eyes are not adequately tracking the subject's device, an audible and/or textual notification may be generated by the application instructing the user to better track the device with their eyes, and/or repeat the process.

The application may determine (e.g., using images and/or eye tracking data accessed from the mobile device using an application programming interface) if there is a lack of smooth pursuit of the mobile device by the subject's eyes. For example, the application may determine whether the eyes cannot smoothly track the moving mobile device and whether the eyes exhibit jerky movements. Such detected inability of the subject's eyes to perform "smooth pursuit" may indicate that the subject's brain (and decision making ability) is impaired as a result of an intoxicating substance, such as alcohol or certain drugs.

The application may determine via an analysis of eye position and orientation data from the mobile device an analysis of the data indicating the movement, position, and/or orientation of the subject's eyes whether the subject exhibits distinct nystagmus at maximum deviation, where when the eyes are moved to the side and held for a certain period of time (e.g., 2, 3, 4, or 5 seconds), nystagmus becomes more pronounced. Such detected distinct nystagmus at maximum deviation may indicate that the subject's brain (and decision making ability) is impaired because of an intoxicating substance, such as alcohol or certain drugs.

The subject may be instructed to smoothly move the mobile device to one side until the subject's eye has gone as far to the side as possible (where no white may be showing in the corner of the eye at maximum deviation). Thus subject may be audibly and/or textually instructed by the application to hold the eye at that position for a period of time (e.g., four or more seconds), and the data indicating the movement, position, and/or orientation of the subject's eyes (e.g., the pupils) may be examined to detect distinct and sustained eye nystagmus. For example, a person may exhibit a minor amount of jerking of the eye (and hence the pupil) at maximum deviation even when not under the influence of an intoxicating substance, but such jerking will only result in small perturbations and will typically not be sustained for more than 1-3 seconds. When a person is under the influence of an intoxicating substance, the eye jerking will have greater perturbations, and may be sustained for relatively longer periods of time (e.g., greater than four seconds). The application may detect the eye jerking, measure the distance of pupil movement during eye jerking, and measure how long (e.g., how many seconds) the jerking persisted.

The application may determine via an analysis of the position, movement, and/or orientation data of the subject's eyes (e.g., the pupils) whether the subject exhibits onset of nystagmus prior to 45 degrees, wherein nystagmus occurs when the eyes are still looking forward but are within 45 degrees of center. Such detected onset of nystagmus prior to 45 degrees may indicate that the subject's brain (and decision making ability) is impaired because of an intoxicating substance, such as alcohol or certain drugs. When a person is under the influence of an intoxicating substance, the eye jerking will have greater perturbations, and may be sustained for relatively longer periods of time (e.g., greater than four seconds), than when sober. The application may detect the eye jerking, measure the distance of pupil movement during eye jerking, and measure how long (e.g., how many seconds) the jerking persisted.

Optionally, each foregoing determination regarding smooth pursuit of the mobile device by the subject's eyes, distinct nystagmus at maximum deviation, and/or onset of nystagmus prior to 45 degrees, may be weighted differently and used to generate a score (e.g., a nystagmus score) indicative of the likelihood that the subject is (or is not) under the influence of an intoxicating substance such that the subject is considered unable to provide a legitimate, valid consent to certain activities, such as sex. For example, a determination may be made as to whether the nystagmus score exceeds a predefined threshold, and if so, a determination may be made the subject is likely under the influence of an intoxicating substance such that the subject is considered unable to provide a legitimate consent to certain activities.

Optionally, the subject's movement of the device (and hence the movement of the built in device camera) may be tracked in real time using on board device sensors to verify that the subject is moving the device smoothly and that the subject is tracking the device with the subject's eyes (as opposed to gazing elsewhere). For example, detecting smooth motion of the device while capturing images of the subject's gaze may be performed by analyzing three axis accelerometer and gyroscope readings from the subject's device. The smoothness of motion may be determined by examining the patterns and characteristics of these sensor signals. For example, the readings from the three axes of the accelerometer may be utilized to compute the magnitude of the overall acceleration experienced by the device. The gyroscope readings may be used to calculate the angular velocity, which indicates the rate of rotation around each axis. Optionally, low-pass filters may be applied to the acceleration and angular velocity signals to remove or reduce high-frequency noise. This helps analyze the smooth components of the motion.

If the monitored acceleration varies during the movement by more than a threshold amount (optionally for more than a threshold period of time), indicating that the acceleration is not stable, a determination may be made that the subject is not smoothly moving the device. If the detected angular velocity is determined not consistent (e.g., varies by more than a threshold amount, optionally for more than a threshold period of time), indicating that there are abrupt changes in in rotation speed, a determination may be made that the subject is not smoothly moving the device.

Optionally, in response to detecting that the subject is not smoothly moving the subject's computer-equipped device, an audible and/or textual notification may be generated by the application to move the device more smoothly, slowly, and/or to repeat the process. Optionally, the smoothness of the movement of the device may be utilized in determining whether the subject is under the influence of an intoxicating system and is unable to provide a valid consent.

Additionally, a pupillary response examination is optionally conducted. During this test, the device's front-facing camera captures the subject's eye reactions to the illuminated screen of the subject's device. The cumulative results from these tests may then optionally be compared against the subject's pre-recorded baseline (e.g., accessed from a database of records comprising a record for the subject), datasets used to train the artificial intelligence system, or a combination of both. This comparison enhances the accuracy in determining the likelihood of the subject being under the influence.

For example, alcohol can influence the size of a person's pupils due to its impact on the nervous system. The pupils are the black circular openings at the center of the eye, and their size is controlled by the muscles of the iris. The iris can reflexively dilate the pupil (making the pupil larger) or constrict the pupil (making the pupil smaller) to control the amount of light let through. Alcohol consumption causes the iris muscles to relax, resulting in a dilated pupil and may slow pupil reflexes, delaying the pupils' ability to constrict in the presence of increased light.

In particular, alcohol has a depressant effect on the central nervous system, slowing down the activity of neurons in the brain. Alcohol enhances the inhibitory effects of the neurotransmitter gamma-aminobutyric acid (GABA) and inhibits the excitatory effects of neurotransmitters, such as glutamate. The central nervous system controls the size of the pupil through a balance between the sympathetic and parasympathetic nervous systems.

As discussed above, the size of the pupil is regulated by the iris muscles (the sphincter pupillae and dilator pupillae muscles). The parasympathetic nervous system, through the release of acetylcholine, initially causes the sphincter pupillae muscle to contract, leading to miosis (constriction of the pupil). The sympathetic nervous system, on the other hand, causes the dilator pupillae muscle to contract, leading to mydriasis (dilation of the pupil).

Alcohol enhances the parasympathetic nervous system's activity, increasing the release of acetylcholine and subsequent miosis.

As the alcohol is metabolized in the body and alcohol's depressant system effects on the nervous take hold, the pupils may dilate, which is sometimes referred to as mydriasis.

Certain drugs, such as opioids may also affect the size of the pupil. For example, opioids cause miosis (pupillary constriction). The constriction occurs because opioids, such as heroin, oxycodone, and other painkillers act on the brainstem, resulting in a decrease in the release of neurotransmitters that regulate pupil size.

Computer vision may be utilized to detect pupil size, optionally in real time. A subject may be instructed (e.g., via audible and/or text instructions) to view a front facing camera on the subject's mobile device. Optionally, an image may be displayed by the application via the device display that the subject is instructed to focus on.

Still and/or video images of the subject's eyes may be captured by one or more of the device's cameras (e.g., an RGB camera and/or an infrared camera, or a combination of different sensors). The images may be preprocessed to enhance the subsequent analysis. The preprocessing may include adjusting image brightness/luminescence, contrast, and/or sharpness. Optionally, image noise may be filtered out using a low pass filter. Brightness/luminescence adjustment may include changing the overall intensity of pixel values in an image.

Brightness/luminescence adjustment may be used to control the overall luminance of an image. Brightness/luminescence adjustment may be used to correct underexposed or overexposed images, making details more visible, and improving overall visibility for analysis. For example, brightness/luminescence adjustment may be performed by adding or subtracting a constant value for some or all pixels in the image.

Contrast refers to the difference in intensity between the darkest and lightest parts of an image. The contrast adjustment may be performed by redistributing pixel values to increase or decrease this difference. Histogram equalization may be utilized for contrast enhancement. Contrast adjustment may be used to enhance the visibility of details in an image. Increasing contrast makes the features more distinguishable, while decreasing contrast can help in cases where details are overly emphasized.

Sharpness adjustment may be performed using image filtering techniques. For example, convolution with a high-pass filter may be utilized to enhance high-frequency components in an image, making edges and details appear more pronounced, assisting in edge detection for identifying the pupil.

Face detection algorithms may be utilized to locate and isolate the face within the images. This helps narrow down the region of interest for pupil detection.

Face detection may optionally be performed using one or more of the following techniques. Optionally, some or all of the following techniques may be applied to a grayscale version of the image.

Haar cascades, a type of classifier that uses Haar-like features (e.g., edge features, line features, four rectangle features) to detect objects may be utilized. For example, a pre-trained Haar cascade classifier for faces may be utilized, and it scans the image at different scales and positions to identify regions that likely contain faces.

Histogram of Oriented Gradients (HOG), a feature descriptor technique that captures information about the local gradients in an image, may be utilized. HOG may be utilized in combination with a support vector machine (SVM) classifier for face detection by identifying patterns associated with faces.

A Viola-Jones framework may be utilized that combines Haar cascades with machine learning. It may use integral images for rapid feature evaluation and may employ a classifier to determine whether a particular region contains a face.

Optionally, in addition or instead, deep learning techniques may be utilized in performing face detection.

For example, a region-based convolutional neural network (R-CNN) may learn hierarchical features directly from the data. By way of illustration, a set of region proposals may be generated that are likely to contain objects. In the case of face detection, these proposals represent candidate regions in the input image where a face might be located. The proposed regions may then be warped to a fixed size (e.g., using Region of Interest (RoI) pooling) to ensure that no matter the size or aspect ratio of the proposed region, it can be fed into subsequent layers of the neural network. The warped regions may be input into a convolutional neural network (CNN) for feature extraction. The CNN may be pre-trained on a large dataset of faces and can capture hierarchical features from the input image. The CNN may comprise an input layer, an output layer, one or more hidden convolutional layers comprising nodes, a pooling layer, and an error function. During training, the CNN computes label predictions for the input data, the error function is used to calculate the loss between predictions and actual labels, gradients of the loss with respect to the model parameters (e.g., node weights) are computed and the model parameters are updated (e.g., using backpropagation).

The extracted features are then fed into different branches of the network: classification branch and a regression branch. The classification branch determines the probability of each proposed region containing a face, and the regression branch refines the coordinates of the bounding box around the detected face. After classification and regression, a post-processing step (e.g., Non-Maximum Suppression (NMS)) may be applied. NMS may be utilized to reduce or eliminate redundant and overlapping bounding boxes, keeping only the most confident predictions (e.g., having a confidence level above a specified threshold).

By way of further example, a Multi-task Cascaded Convolutional Network (MTCNN) algorithm may be utilized to identify a face in an image. MTCNN may propose candidate regions using a CNN in a stage, and then refine and filter the candidates in subsequent stages. Haar cascades are a type of classifier that uses Haar-like features to detect objects. A pre-trained Haar cascade classifier for faces may be employed to scan the image at different scales and positions and to identify regions that likely contain faces.

Once the face is identified, the region around the eyes may be extracted using the information obtained from face detection. This step may focus the analysis on the eyes, reducing computational complexity and computer resource utilization.

A pupil detection algorithm may then be used to identify and locate the pupil within each eye. One or more computer vision techniques, such as edge detection, image thresholding, and contour analysis, may be used to identify and locate the pupil.

Edge detection (e.g., performed using Canny, Sobel, and/or Prewitt operators) identifies boundaries within an image, highlighting areas where there are significant changes in intensity, which often correspond to object boundaries. The edge detection algorithm is applied to the input image (which may be limited to the eyes), thereby highlighting the edges and contours in the image, including the boundary of the pupil.

After edge detection, image thresholding may be applied to convert the grayscale image into a binary image, where pixels belonging to the pupil are set to one value (e.g., white) and the background to another value (e.g., black). Adaptive thresholding may be utilized. Contour analysis may be utilized to identify and analyze the contours, or boundaries, of objects in an image, and so may be used to locate and extract the boundary of the pupil. For example, the contours in the binary image may be obtained after thresholding. The contours corresponding to the pupil may be identified based on characteristics such as size, circularity, or area. The contour that best represents the pupil is identified and the corresponding coordinates or region are extracted.

Pupil size measurement may then be performed on the identified pupil. The diameter or area of each pupil in the image may be determined. For example, the number of pixels in a line defining the diameter of the pupil may be counted, and the pixel measurements may be converted to a distance using a standard of measurement (e.g., millimeters).

As discussed elsewhere herein, a user's blink rate may optionally be utilized in determining whether a subject is under the influence of a substance which may impair the subject's ability to provide informed, legal consent to certain activities, such as sexual activities. With respect to intoxicating substances (e.g., alcohol, opioids, and the like), certain intoxicating substances act as a central nervous system depressant, and they may slow down neural activity. This may lead to a decrease in overall motor functions, including the rate of eye blinking. For example, slowed neural responses can affect the coordination of muscles, including those responsible for blinking. In addition, the consumption of intoxicating substances may cause delayed reflexes and impaired reaction time. This delay may be reflected in slower eye movements, including blinking.

As discussed elsewhere herein, certain described techniques may be used to identify a subject's eyes in images. A blink detection algorithm may then be utilized that analyzes the changes in the appearance of the eyes over time, such as that caused by blinking. This information may be utilized to determine a blink rate. A determination may be made that the subject is under the influence of a substance such that the subject is incapable of providing a valid consent to certain acts (e.g., sexual activities) when the blink rate falls below a specified threshold.

For example, the Eye Aspect Ratio (EAR), a measure of the eye's openness and closure may be determined. The EAR may be calculated based on the positions of certain landmarks on the eyes. A significant decrease in EAR (e.g., a decrease above a predefined threshold) indicates a blink.

By way of further example, eye closure detection may be performed to detect a blink. Changes in pixel intensities (in the pixels corresponding to the location of the eye(s)) over time may be tracked to determine a blink (e.g., where the change from relatively higher intensity to relatively lower intensity that is greater than a specified threshold within a threshold period of time may indicate a blink).

A temporal analysis may be performed, wherein the blink detection determinations may be monitored over time (e.g., 15-30 seconds) to calculate the blink rate (e.g., blinks per second and/or blinks per minute).

If the blink rate is below a specified threshold, indicating intoxication, a determination may be made that the user is not intellectually capable of providing a valid consent to certain actions (e.g., sexual activity).

The thresholds may be set based on the chosen blink detection algorithm, image lighting conditions, the subject's weight and/or height, and/or other factors.

The images (e.g., video frames or still images) comprising the subject's eyes may be continuously analyzed in real-time to monitor blink events and update the blink rate in a dynamic manner. Images used to detect one indication of intoxication may be used to detect other indications of intoxication. For example, the same images used to detect nystagmus may be used to detect pupil size. By way of further example, the same images used to detect pupil size may be used to detect blinking.

Figure 6:
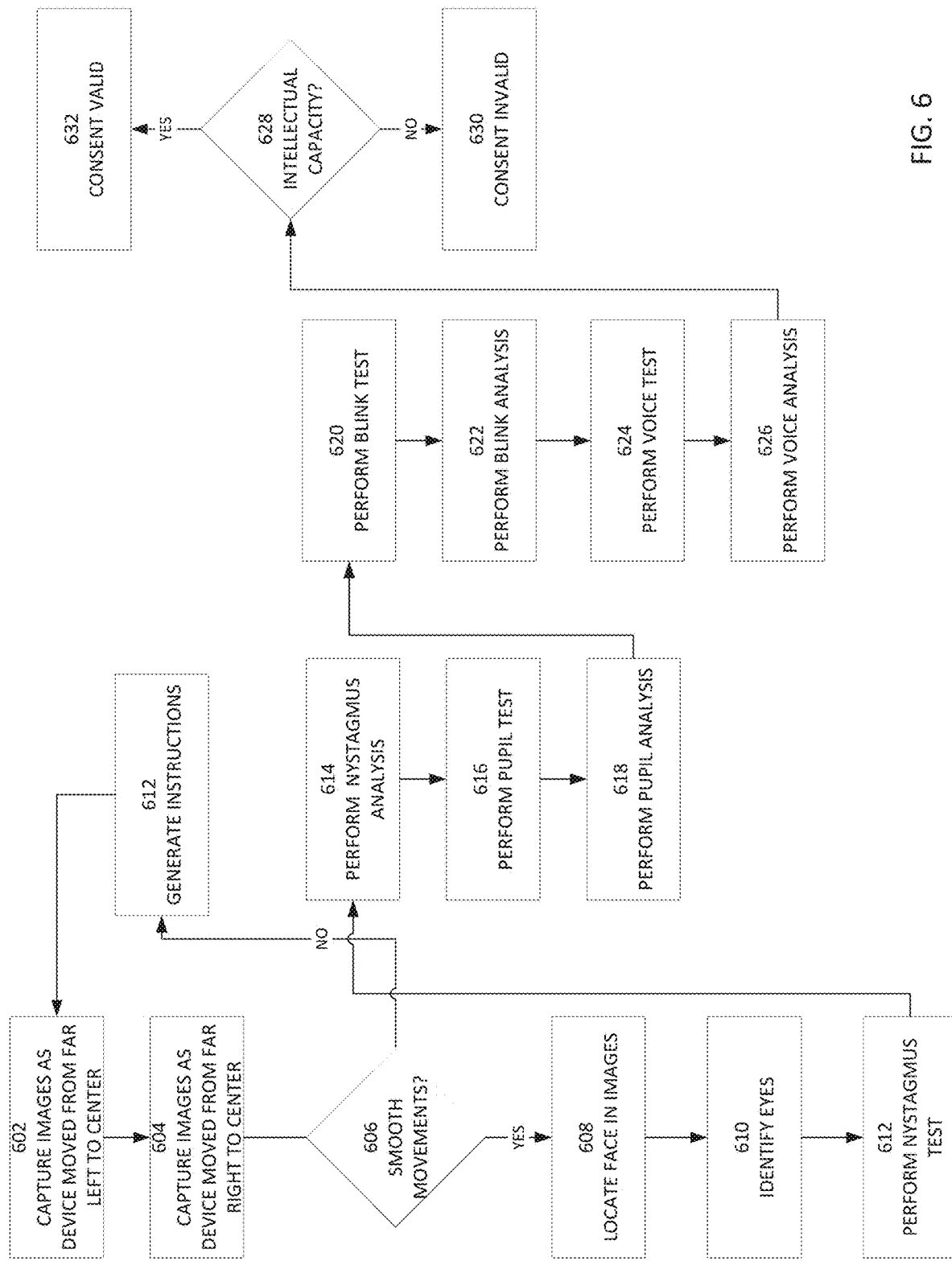
FIG. 6 illustrates an example process.

Certain example figures will now be described. Referring now to FIG. 6, an example process of determining whether a subject is intoxicated and has the intellectual capacity to provide consent to certain activities (e.g., sexual activities). It is understood that some or all of the techniques described above may be utilized at corresponding blocks of the example process. For example, the process illustrated in FIG. 6 may be used in conjunction with some or all of the states, actions, and techniques of the processes illustrated in FIGS. 3A and 3B. By way of illustration, the nystagmus determinations, the pupil dilation determinations, the blink rate determinations, and/or the voice determinations may be used to determine whether consent is satisfactory in FIG. 3B. Some or all of the various determinations and identifications discussed may be stored in memory (e.g., in a database user record of the subject) and accessed from memory to perform the various analyses, reporting, and/or actions described herein.

An image capture of the subject's face may be performed to be used to conduct certain tests and analysis. For example, at block 602, an application on a subject's device (e.g., a smart phone or other camera equipped mobile computer device) may provide voice and/or text instructions to hold the device in their left hand at arm's length and move the device slowly from the far left, at eye level, to in front of the subject's face, and to track the device (e.g., an illuminated display of the device) with their eyes. This movement may take 3-8 seconds. In addition, the subject may be instructed to pause the movement and to hold their gaze for a certain period of time (e.g., 3, 4, 5, 6, or 7 seconds), such as when the device is at the far left and/or at some intermediate point prior to 45 degrees between the leftmost position and the subject's face. Images (e.g., still and/or video images) of the subject's face may be captured by the front facing camera of the device during such movement and pauses.

At block 604, the application on the subject's device may provide voice and/or text instructions to hold the device in their right hand at arm's length and move the device slowly from the far right, at eye level, to in front of the subject's face, and to track the device (e.g., an illuminated display of the device) with their eyes. Images (e.g., still and/or video images) of the subject's face may be captured by the front facing camera of the device. In addition, the subject may be instructed to hold their gaze for a certain period of time (e.g., 3, 4, 5, 6, or 7 seconds), such as when the device is at the far right and/or at some intermediate point prior to 45 degrees between the rightmost position and the subject's face.

Figure 7A:
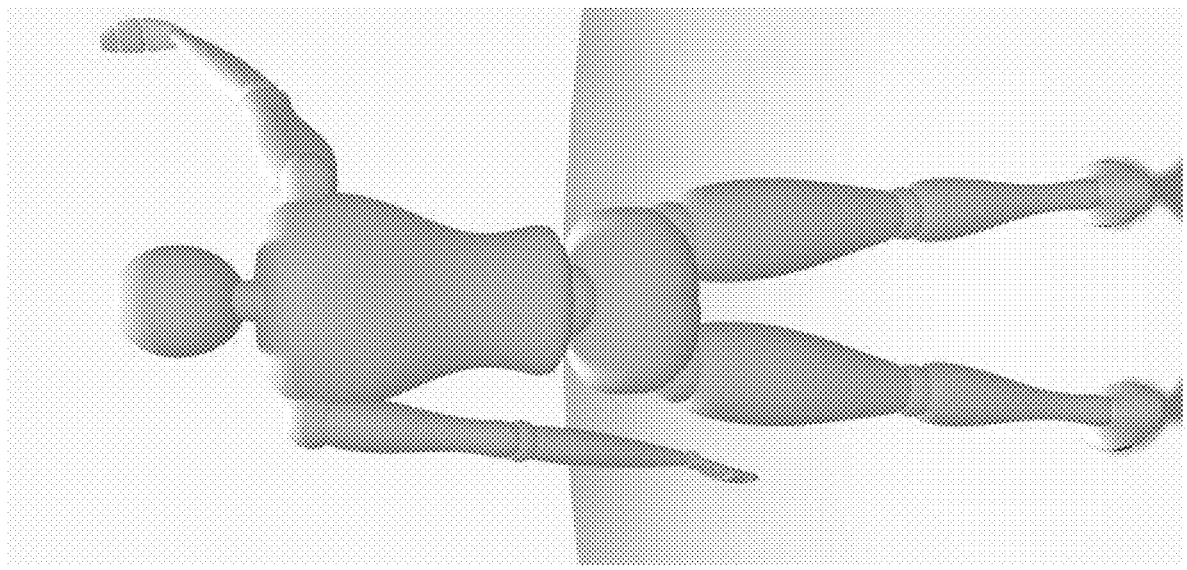
FIGS. 7A-7H illustrate example positioning of a camera device about a subject's face.
Figure 7B:
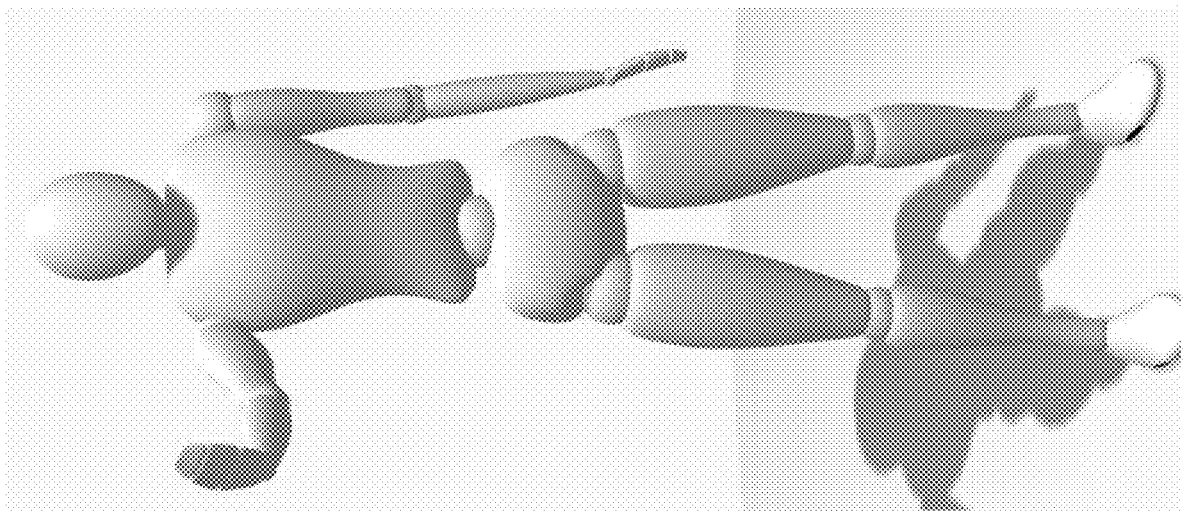
Figure 7C:
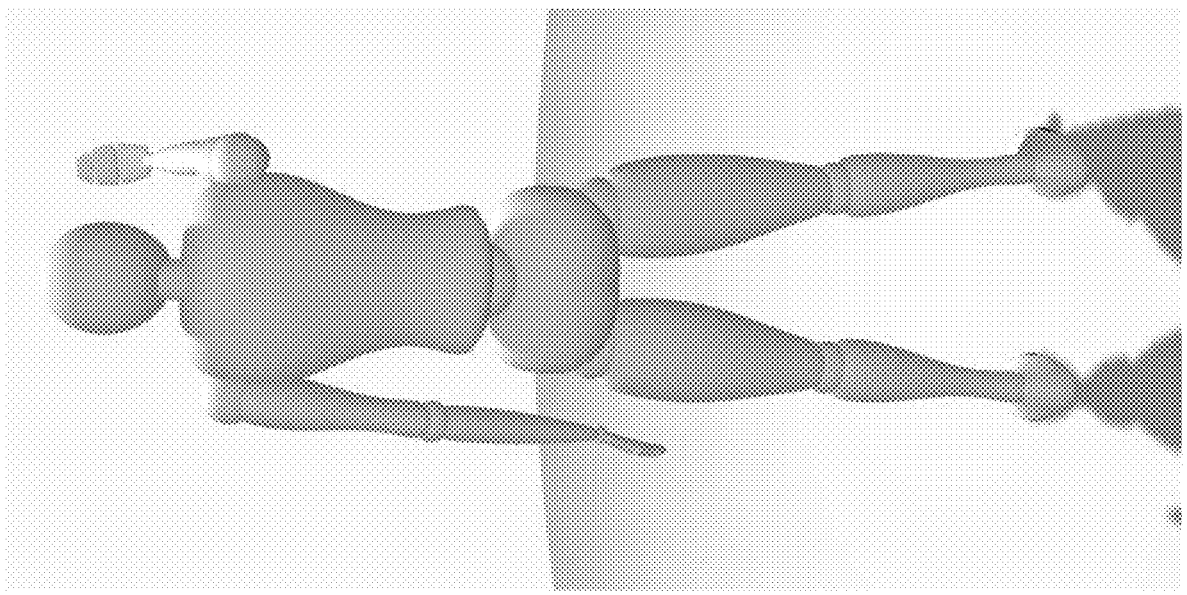
Figure 7D:
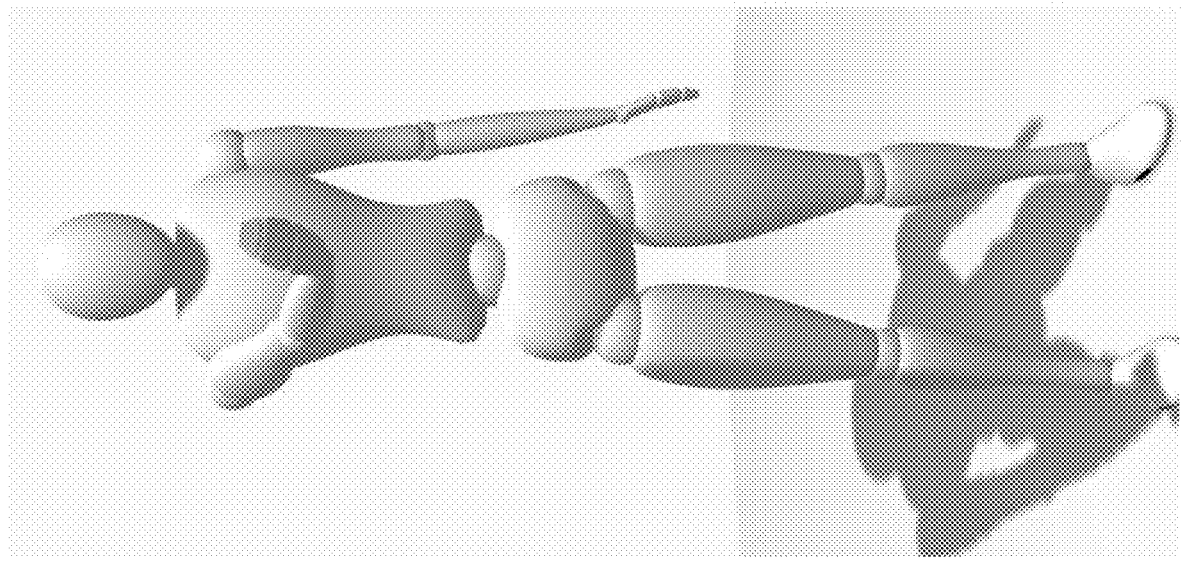

For example, with reference to FIGS. 7A-7H, example positionings of the front facing camera-equipped device relative to a subject's face are depicted. FIG. 7A illustrates the back of the subject, with the subject's right hand holding a front facing mobile device, outstretched towards the right of the subject's face and eyes, while images are being captured of at least a portion of the subject's face by the subject's device. FIG. 7B illustrates the front of the subject with the subject's right hand, holding the front facing mobile device, outstretched towards the right of the subject's face and eyes, while images of at least a portion of the subject's face are being captured by the subject's device. FIG. 7C illustrates the back of the subject with the subject's right hand holding the front facing mobile device, outstretched in front of the subject's face and eyes, while images of at least a portion of the subject's face are being captured by the subject's device. FIG. 7D illustrates the front of the subject with the subject's right hand, holding the front facing mobile device, outstretched in front of the subject's face and eyes, while images of at least a portion of the subject's face are being captured by the subject's device.

Figure 7E:
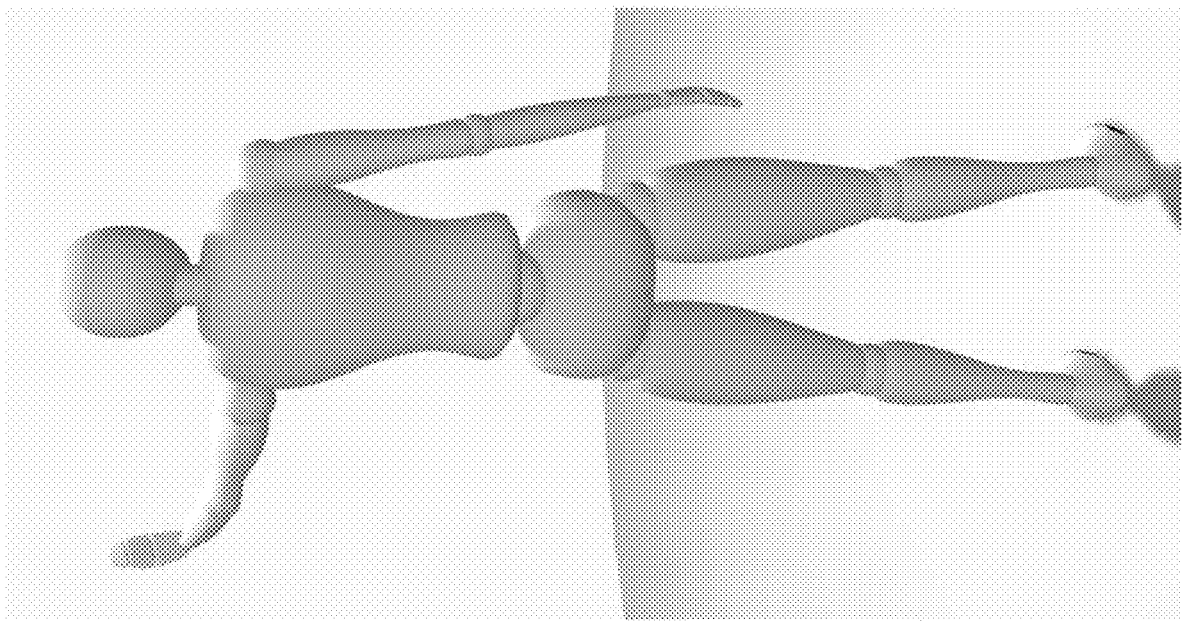
Figure 7F:
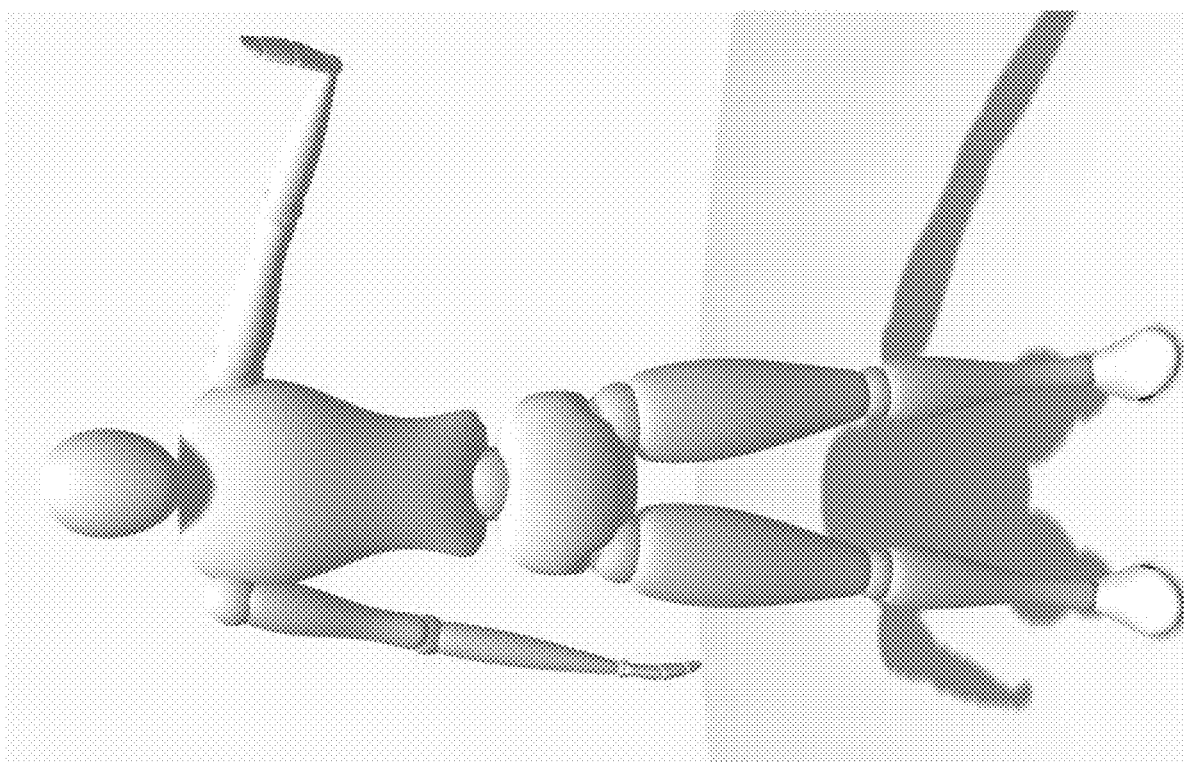
Figure 7G:
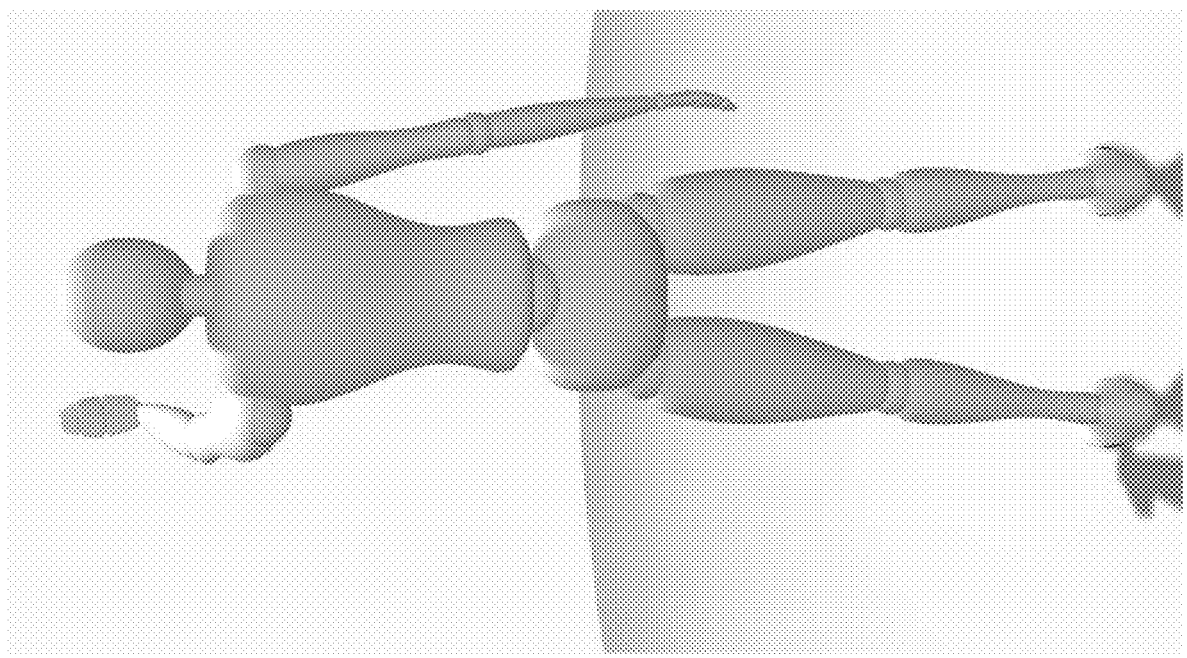
Figure 7H:
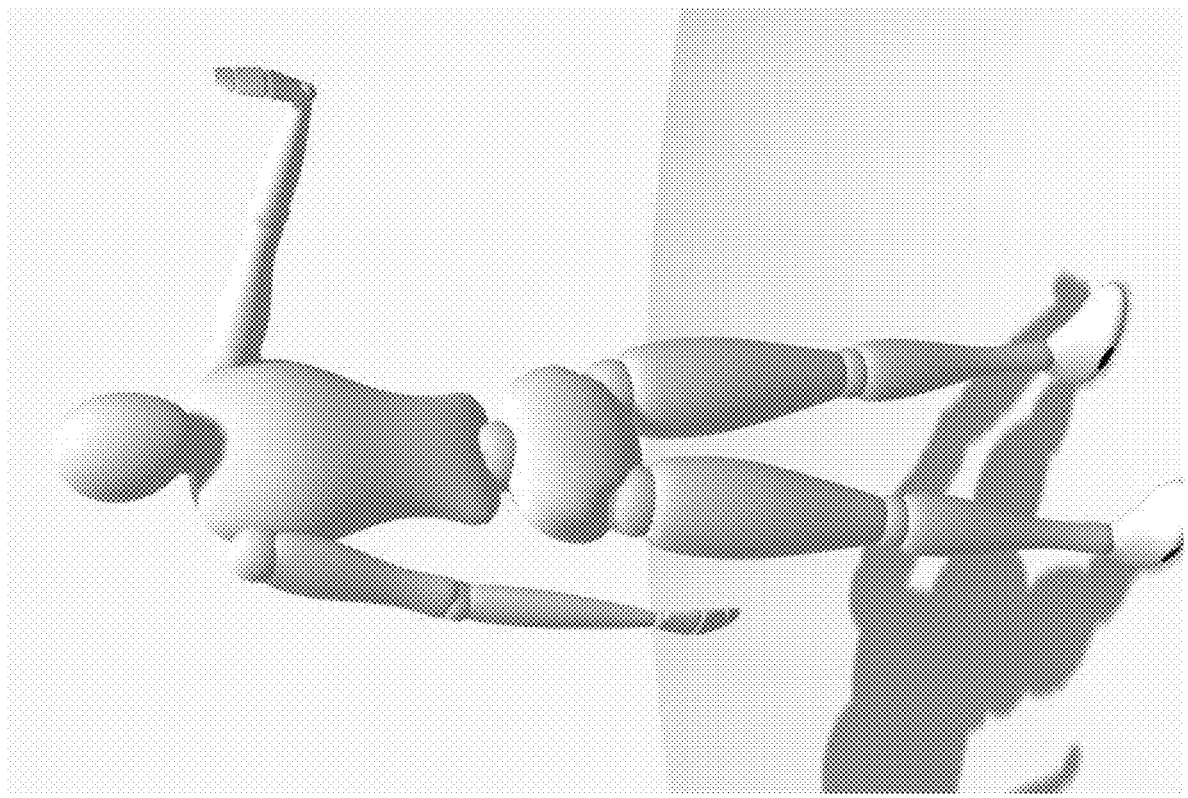

FIG. 7E illustrates the back of the subject with the subject's left hand, holding the front facing mobile device, outstretched towards the left of the subject's face and eyes, while images of at least a portion of the subject's face are being captured by the subject's device. FIG. 7F illustrates the front of the subject with the subject's left hand, holding the front facing mobile device, outstretched towards the left of the subject's face and eyes, while images of at least a portion of the subject's face are being captured by the subject's device. FIG. 7G illustrates the back of the subject with the subject's left hand, holding the front facing mobile device, outstretched in front of the subject's face and eyes, while images of at least a portion of the subject's face are being captured by the subject's device. FIG. 7H illustrates the front of the subject with the subject's left hand, holding the front facing mobile device, outstretched in front of the subject's face and eyes, while images of at least a portion of the subject's face are being captured by the subject's device.

At block 606, a determination may be made as to whether the subject moved the device smoothly when moving the device as discussed above. For example, as discussed elsewhere herein, a smoothness tracking service may be utilized to detect if the subject is smoothly moving a camera equipped device while using the device to capture images of the subject's face (and the eyes in particular) in order to perform certain analysis described herein. In response to detecting that the device is not being smoothly moved (which may result in a degraded and possibly erroneous analysis), at block 612, an audible and/or visual notification may be provided to the subject to move the device more smoothly. Optionally, such analysis may be performed in real time during the image capture process of block 602 and 604, and the notification may be generated while the subject is in the process of moving the device during the image capture process.

At block 608, the subject's face in the images may be located and labeled, optionally in real time. Face detection algorithms may be utilized to locate and isolate the face within the images. This helps narrow down the region of interest for pupil detection. Certain examples of face detection algorithms and techniques (e.g., Haar cascades, Histogram of Oriented Gradients, Viola-Jones framework, and deep learning techniques (e.g., R-CNN, Multi-task Cascaded Convolutional Network, and/or the like) that may be used are described herein. At block 610, the eyes in the located face may be identified and their movement (the movement of the pupil in each eye) from frame-to-frame and/or gaze may be determined. For example, the region around the eyes may be extracted using the information obtained from face detection. This block may focus the analysis on the eyes, reducing computational complexity and computer resource utilization.

For example as similarly discussed elsewhere herein, facial landmark detection may be utilized to identify certain landmarks on the face, such as the corner of eyes. Optionally, an R-CNN may be utilized to detect eyes in the image. The movement of the identified eyes may be tracked over time by analyzing the positions of the detected facial landmarks corresponding to the eyes in consecutive frames. Optionally, optical flow techniques (e.g., differential techniques) can be employed to estimate the motion (direction and speed) of pixels between frames, allowing the tracking of eye movements.

By way of example, differential methods (e.g., the Lucas-Kanade method) may be used to compute optical flow by analyzing intensity gradients in the images. In addition or instead, correlation-based methods may be utilized that identify the best matching region in the next frame for each pixel in the current frame. In addition or instead, deep learning, convolutional neural networks (CNNs) may be utilized to directly learn optical flow from image sequences.

Optionally, the pupils may be detected and tracked in order to determine their position and orientation for the various analyses described below. The images may be preprocessed to enhance the subsequent analysis (e.g., to track the movement of the pupil and hence the eye). The preprocessing may include adjusting image luminescence/brightness (e.g., by adding or subtracting a constant value for some or all pixels in the image), contrast (e.g., using histogram equalization), and/or sharpness (e.g., using a high-pass filter), optionally utilizing techniques described herein. Optionally, image noise may be filtered out using a low pass filter.

A pupil detection algorithm may then be used to identify and locate the pupil within each eye. One or more computer vision techniques, such as edge detection (e.g., to identify boundaries in a given image), image thresholding (e.g., to convert the grayscale image into a binary image, where pixels belonging to the pupil are set to one value and the background to another value), and contour analysis (e.g., to identify and analyze the contours, or boundaries, of objects in an image, and to identify and locate the pupil) as discussed elsewhere herein. The movement and orientation of the pupil, and hence the eye may then be tracked.

Optionally, as similarly discussed elsewhere herein, contour analysis may be utilized to identify and analyze the contours, or boundaries, of objects in an image, and so may be used to locate and extract the boundary of the pupil. For example, the contours in the binary image may be obtained after thresholding. The contours corresponding to the pupil may be identified based on characteristics such as size, circularity, or area. The contour that best represents the pupil is identified and the corresponding coordinates or region are extracted.

Optionally, gaze estimation models may be utilized to predict the direction in which the subject is looking. A gaze estimation model may take into account the position of the eyes (e.g., the pupils), head orientation, and/or other factors. Deep learning-based models, such as CNNs and/or recurrent neural networks (RNNs), may be trained for and used for gaze determination.

At block 612, the subject's eye positions and/or gaze in the captured images may optionally be determined using one or more of the foregoing techniques. At block 614, a determination may optionally be made as to whether the subject is suffering from nystagmus and/or an inability to perform smooth pursuit. For example, the application may detect eye jerking over two or more images, measure the distance of pupil movement during eye jerking, and measure how long (e.g., how many seconds) the jerking persisted. The process may determine via an analysis of the position, movement, and/or orientation data of the subject's eyes (e.g., via detection of the pupil position and movement) whether the subject exhibits a failure to execute smooth pursuit of the device by the subject's eyes, distinct nystagmus at maximum deviation, and/or onset of nystagmus prior to 45 degrees.

When a person is under the influence of an intoxicating substance, the eye jerking will have greater perturbations, and may be sustained for relatively longer periods of time (e.g., greater than four seconds), than when sober. The process may detect the eye jerking, measure the distance of pupil movement during eye jerking, and measure how long (e.g., how many seconds) the jerking persisted.

Optionally, each foregoing determination regarding smooth pursuit of the mobile device by the subject's eyes, distinct nystagmus at maximum deviation, and/or onset of nystagmus prior to 45 degrees, may be weighted differently and used to generate a score (e.g., a nystagmus score) indicative of the likelihood that the subject is (or is not) under the influence of an intoxicating substance such that the subject is considered unable to provide a legitimate, valid consent to certain activities, such as sex. Optionally, a determination may be made as to whether the nystagmus score exceeds a predefined threshold, and if so, a determination may be made that the subject is likely under the influence of an intoxicating substance such that the subject is considered unable to provide a legitimate consent to certain activities.

Optionally, at block 616, a determination may optionally be made as to the size of the subject's pupil. As similarly discussed elsewhere herein, computer vision may be utilized to detect pupil size, optionally in real time. A subject may be instructed (e.g., via audible and/or text instructions) to view a front facing camera on the subject's mobile device.

Optionally, an image may be displayed by the application via the device display that the subject is instructed to focus on. Still and/or video images of the subject's eyes may be captured by one or more of the device's cameras (e.g., an RGB camera and/or an infrared camera, or a combination of different sensors).

As similarly discussed elsewhere, the images may be preprocessed to enhance the subsequent analysis (e.g., to determine the size of the pupil). The preprocessing may include adjusting image brightness/luminescence (e.g., by adding or subtracting a constant value for some or all pixels in the image), contrast (e.g., using histogram equalization), and/or sharpness (e.g., using a high-pass filter), optionally utilizing techniques described herein. Optionally, image noise may be filtered out using a low pass filter.

A pupil detection algorithm may then be used to identify and locate the pupil within each eye. One or more computer vision techniques, such as edge detection (e.g., to identify boundaries in a given image), image thresholding (e.g., to convert the grayscale image into a binary image, where pixels belonging to the pupil are set to one value and the background to another value), and contour analysis (e.g., to identify and analyze the contours, or boundaries, of objects in an image, and to identify and locate the pupil) as discussed elsewhere herein. Pupil size measurement may then be performed on the identified pupil. The diameter or area of each pupil in the image may be determined. For example, the number of pixels in a line defining the diameter of the pupil may be counted, and the pixel measurements may be converted to a distance using a standard of measurement.

At block 618, an analysis may optionally be performed using the pupil size determination of block 616. As discussed elsewhere herein, consumption of alcohol, opioid, and other drugs may affect the pupil size and diameter of the pupil. Alcohol enhances the parasympathetic nervous system's activity, increasing the release of acetylcholine and subsequent miosis (pupillary constriction). As the alcohol is metabolized in the body and alcohol's depressant effects on the nervous system occur, the pupils may dilate (referred to as mydriasis). Opioids cause miosis (pupillary constriction). The constriction occurs because opioids act on the brainstem, resulting in a decrease in the release of neurotransmitters that regulate pupil size. The determined diameter or size of the pupil may be compared against a threshold upper diameter limit (wherein above that limit it is likely that the subject is experiencing alcohol intoxication) and/or a threshold lower diameter limit (wherein below that limit it is likely the subject is experiencing opioid intoxication). Optionally, the threshold(s) may be based on a baseline pupil diameter or size previously determined from images taken when it is known or represented that the subject was not under the influence of an intoxicating substance. Thus, if a determination is made that the pupil diameter or size is larger than or otherwise satisfies the upper level threshold, a determination may be made that it is likely the user is experiencing alcohol intoxication. If a determination is made that the pupil diameter or size is smaller than or otherwise satisfies the lower level threshold, a determination may be made that it is likely the user is experiencing opioid or the initial stages of alcohol intoxication. A score may be generated indicating the likelihood of intoxication based on the determined pupil size. Optionally, two score may be generated, one score that indicates the likelihood of alcohol intoxication, and one score that indicates the likelihood of drug intoxication.

At block 620, a blink test may optionally be performed. The subject may be instructed (audibly and/or textually) to look at the camera for a specified period of time (e.g., 10 seconds, 20 seconds, 30 seconds, 1 minute), and images (e.g., still and/or video images) of the subject's face may be captured by the device's camera. The face and eyes may be located as similarly discussed elsewhere herein. A blink detection algorithm may be utilized that analyzes the changes in the appearance of the eyes over time, such as that caused by blinking. This information may be utilized to determine a blink rate.

A determination may be made that the subject is under the influence of a substance such that the subject is incapable of providing a valid consent to certain acts (e.g., sexual activities) when the blink rate falls below a specified threshold. For example, the Eye Aspect Ratio (EAR) may be calculated based on the positions of certain landmarks on the eyes. A significant decrease in EAR (e.g., a decrease above a predefined threshold) indicates a blink. By way of further example, eye closure detection may be performed to detect a blink. Changes in pixel intensities over time may be tracked to determine a blink (e.g., where the change from relatively higher intensity to relatively lower intensity that is greater than a specified threshold within a threshold period of time may indicate a blink). The blink detection determinations may be monitored over time to calculate the blink rate.

At block 622, a determination may be as to whether the blink rate is below a specified threshold, a determination may be made that the user is likely intoxicated. The threshold may be set based on the chosen blink detection algorithm, image lighting conditions, the subject's weight and/or height, and/or other factors.

At block 624, a voice recording of the subject may optionally be received. The voice recording may be received in a video recording of the subject reading a script as similarly described above with respect to FIG. 3B. At block 626, the voice recording may optionally be analyzed to determine if it is from the purported subject and a determination may be made as to whether the user is intoxicated and the degree of intoxication. For example, as similarly discussed elsewhere herein, a given recording of a purported subject may be compared to an enrollment voice recording of the subject to determine if they match. For example, as similarly discussed elsewhere herein, a digital voiceprint generated from the received voice recording may be compared to a voiceprint generated from an enrollment recording. If they do not match, an exception action may be triggered. The exception action may include generating a notification and transmitting the notification to a subject, another user, and/or an administrator, and generating a consent process failure indication that may be stored in memory.

Optionally, a waveform of glottal pulses estimated from speech may be generated by applying Iterative Adaptive Inverse Filtering (IAIF) to the voice recording. Using the waveform, certain glottal excitations may be detected that indicate evidence of alcohol intoxication over a certain threshold. By way of further example, the voice analysis service may extract low-level acoustic features (e.g. mel-frequency cepstrum) from the voice recording, and n-way direct classification or regression using maximum margin classifiers may be applied to determine a state of intoxication. By way of further example, speed, pitch, tone and emphasis on certain syllables may be detected and may then be compared to known features that present emotions, depression or alcohol intoxication. Optionally, machine learning algorithms such as HMM (Hidden Markov Model), GMM (Gaussian Mixture Model), SVM (Support Vector Machines), or k-NN (k-nearest neighbors algorithm) and deep learning models such as CNN (Convolutional Neural Network) and RNN (Recurrent Neural Network) may be utilized in performing voice analysis. Some or all of the foregoing techniques may be utilized to determine a likelihood that the subject is intoxicated.

At block 628, based on the nystagmus analysis, the smooth tracking analysis, the pupil size/diameter analysis, the blinking analysis, and/or the voice analysis, (where the foregoing analysis may indicate a state and/or degree of alcohol and/or pharmaceutical/opioid intoxication) a determination may be made as to whether the subject has the intellectual capacity to provide consent. For example, the formula discussed elsewhere herein a reproduced below may be utilized in determining whether the subject is capable of providing a valid consent.

For example, an example, optional intoxication formula used to calculate the likelihood that the subject is unable to provide informed, legal consent is as follows:

$$\text{Likelihood subject is intoxicated } (LSI) = $$
$$1/N \ (W_1D_1 + W_2D_2 + W_3D_3 + W_4D_4 \ ... \ W_nD_n)$$

where:
N=Normalization factor
W=Weight
$D_1$=intoxication determination based on voice analysis
$D_2$=intoxication determination based on eye motion analysis (e.g., horizontal nystagmus, smooth tracking)
$D_3$=intoxication determination based on pupil size/diameter analysis
$D_4$=intoxication determination based on eye blink rate analysis
$D_n$=intoxication determination based on other determinations (e.g., smoothness of movement of the subject's device during testing, ability to focus gaze on the subject's device during testing, and/or other determinations)
Wherein Subject is unable to provide consent when
LSI>Threshold If a determination is made that the subject lacks sufficient intellectual capacity to provide a valid consent, the process may proceed to block 630. An indication that the subject provided an invalid consent may be stored in a record of the subject. In addition, the consent failure indication may be stored in a record associated with a second subject (e.g., a potential sexual partner whose consent is also being analyzed for validity). Optionally, a notification of the consent failure may be transmitted to and presented by the subject's device and a device of the second subject.

If a determination is made that the subject has sufficient intellectual capacity to provide a valid consent, the process may proceed to block 632. A verification that the subject provided a valid consent may be stored in a record of the subject. In addition, the consent may be stored in a record associated with a second subject (e.g., a potential sexual partner whose consent is also being analyzed for validity). Optionally, a notification of the successful consent verification may be transmitted to and presented by the subject's device and a device of the second subject.

Certain aspects will now be further discussed. It is understood that various of the following aspects may be utilized together, and some or all of the elements of the aspects may be combined.

An aspect of the present disclosure relates to a voice authentication process. A code (e.g., a unique code such as described elsewhere herein) is transmitted to a first user electronic address. A determination is made as to whether the code was received from the first user and a second user within a threshold time-period, and if so, the first and second users are enabled to record a consent verification script. Characteristics of the first user recording are compared with those of a first user reference voice recording (e.g., an enrollment voice recording) to determine whether both voice recordings are from the same person and are from the person associated with the relevant account. Characteristics of the second user recording are compared with those of a second user reference voice recording to determine whether they are from the same person. At least partly in response to determining that the first recording and the first user reference voice recording are from the same person and that the second recording and the second user reference voice recording are from the same person a consent verification indication is generated. Optionally, the consent verification indication is transmitted to the first user and/or is stored in memory.

An aspect of the present disclosure relates to verifying a user identifier. Optionally, during a voice authentication process, a code is transmitted to a first user electronic address. A determination is made as to whether the code was received from the first user and a second user within a threshold time period, and if so, the first and second users are enabled to record a consent verification script. Characteristics of the first user recording are compared with those of a first user reference voice recording to determine whether they are from the same person. Characteristics of the second user recording are compared with those of a second user reference voice recording to determine whether they are from the same person. In response to determining that the first recording and the first user reference voice recording are from the same person and that the second recording and the second user reference voice recording are from the same person a consent verification indication is generated.

An aspect of the present disclosure relates to a system configured to process voice recordings and to perform voice authentication, the system comprising: a computer device; a network interface; non-transitory computer readable memory having program instructions stored thereon that when executed by the computer device cause the system to perform operations comprising: receiving, over the network via the network interface, a recording comprising a reference voice recording from a first user during an enrollment process; storing the reference voice recording from the first user in memory; receiving over the network via the network interface, a first consent validation request from a first user; generating a unique validation code; transmitting, over the network via the network interface, the unique validation code to at least a first destination associated with the first user; determining if the unique validation code was received from the first user and a second user within a first threshold period of time; at least partly in response to determining that the unique validation code was received from the first user and the second user within the first threshold period of time, enabling the first user to record the first user reading a first script and the second user to record the second user reading a second script; receiving a first recording from the first user; receiving a second recording from the second user; comparing characteristics of the first recording from the first user with characteristics of the stored reference voice recording of the first user to determine whether the first recording and the stored reference voice recording of the first user are from a same person and determining via an analysis of the first recording whether the first recording indicates that the first user is intellectually competent to provide a first consent to a first action; comparing characteristics of the second recording from the second user with characteristics of a stored reference voice recording of the second user to determine whether the second recording and the stored reference voice recording of the second user are from the same person and determining via an analysis of the second recording whether the second recording indicates that the second user is intellectually competent to provide a second consent to the first action; at least partly in response to determining that: the first recording and the stored reference voice recording of the first user are from the same person and that the first user is intellectually competent to provide the first consent to the first action, and the second recording and the stored reference voice recording of the second user are from the same person and that the second user is intellectually competent to provide the second consent to the first action, generating a consent verification indication; transmitting, over the network via the network interface, to at least one destination associated with the first user, a communication providing the consent verification indication; transmitting, over the network via the network interface, to at least one destination associated with the second user, a communication providing the consent verification indication.

Optionally, the analysis of the first recording further comprises performing an analysis of a power spectrum of the first recording; comparing characteristics of the first recording from the first user with characteristics of the stored reference voice recording of the first user to determine whether the first recording and the stored reference voice recording of the first user are from the same person further comprises using a voice template; comparing characteristics of the first recording from the first user with characteristics of the stored reference voice recording of the first user to determine whether the first recording and the stored reference voice recording of the first user are from the same person further comprises performing liveness detection to determine whether the first recording is from a live person or was from a speaker transducer. Optionally, the analysis of the first recording further comprises performing an analysis of a power spectrum of the first recording. Optionally, comparing characteristics of the first recording from the first user with characteristics of the stored reference voice recording of the first user to determine whether the first recording and the stored reference voice recording of the first user are from the same person further comprises using a voice template. Optionally, comparing characteristics of the first recording from the first user with characteristics of the stored reference voice recording of the first user to determine whether the first recording and the stored reference voice recording of the first user are from the same person further comprises performing liveness detection to determine whether the first recording is from a live person or was from a speaker transducer. Optionally, the analysis of the first recording further comprises determining an estimated state of inebriation. Optionally, the operations further comprise providing content related to obtaining consent to the first user and performing a text process to measure how successfully the first user consumed the content.

An aspect of the present disclosure relates to a computer implemented method configured to perform voice authentication, the method comprising: receiving, at a computer system, a recording comprising a reference voice recording from a first user during an enrollment process; receiving, at the computer system, a first consent validation request from a first user; generating a validation code; transmitting, using the computer system, the validation code to at least a first destination associated with the first user; determining, using the computer system, if the validation code was received from the first user and a second user within a first threshold period of time; at least partly in response to determining that the validation code was received from the first user and the second user within the first threshold period of time, enabling the first user to record the first user reading a first script and the second user to record the second user reading a second script; receiving a first recording from the first user; receiving a second recording from the second user; comparing characteristics of the first recording from the first user with characteristics of the reference voice recording of the first user to determine whether the first recording and the reference voice recording of the first user are from a same person; comparing characteristics of the second recording from the second user with characteristics of a reference voice recording of the second user to determine whether the second recording and the reference voice recording of the second user are from the same person; at least partly in response to determining that: the first recording and the reference voice recording of the first user are from the same person, and the second recording and the reference voice recording of the second user are from the same person, generating, using the computer system, a consent verification indication; transmitting, using the computer system, to at least one destination associated with the first user, a communication providing the consent verification indication; transmitting to at least one destination associated with the second user, a communication providing the consent verification indication.

Optionally, the method further comprising: determining via an analysis of the first recording whether the first recording indicates that the first user is intellectually competent to provide a first consent to a first action, wherein: the analysis of the first recording further comprises performing an analysis of a power spectrum of the first recording; comparing characteristics of the first recording from the first user with characteristics of the reference voice recording of the first user to determine whether the first recording and the reference voice recording of the first user are from the same person further comprises using a voice template; and comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, determining via an analysis of the first recording whether the first recording indicates that the first user is intellectually competent to provide a first consent to a first action, wherein the analysis of the first recording further comprises performing an analysis of a power spectrum of the first recording. Optionally, comparing characteristics of the first recording from the first user with characteristics of the reference voice recording of the first user to determine whether the first recording and the reference voice recording of the first user are from the same person further comprises using a voice template. Optionally, comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, the method further comprising analyzing the first recording and determining an estimated state of inebriation of the first user. Optionally, the method further comprising providing content related to obtaining consent to the first user and performing a text process to measure how successfully the first user consumed the content.

An aspect of the present disclosure relates to a non-transitory computer readable memory having program instructions stored thereon that when executed by a computing device cause the computing device to perform operations comprising: receiving a recording comprising a reference voice recording from a first user during an enrollment process; receiving a first consent validation request from a first user; enabling the first user to record the first user reading a first script and a second user to record the second user reading a second script; receiving a first recording from the first user; receiving a second recording from the second user; comparing characteristics of the first recording from the first user with characteristics of the reference voice recording of the first user to determine whether the first recording and the reference voice recording of the first user are from a same person; comparing characteristics of the second recording from the second user with characteristics of a reference voice recording of the second user to determine whether the second recording and the reference voice recording of the second user are from the same person; at least partly in response to determining that: the first recording and the reference voice recording of the first user are from the same person, and the second recording and the reference voice recording of the second user are from the same person, generating a consent verification indication; transmitting to at least one destination associated with the first user, a communication providing the consent verification indication; transmitting to at least one destination associated with the second user, a communication providing the consent verification indication.

Optionally, the operations further comprising: determining via an analysis of the first recording whether the first recording indicates that the first user is intellectually competent to provide a first consent to a first action, wherein: the analysis of the first recording further comprises performing an analysis of a power spectrum of the first recording; comparing characteristics of the first recording from the first user with characteristics of the reference voice recording of the first user to determine whether the first recording and the reference voice recording of the first user are from the same person further comprises using a voice template; comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, the operations further comprising: determining via an analysis of the first recording whether the first recording indicates that the first user is intellectually competent to provide a first consent to a first action, wherein the analysis of the first recording further comprises performing an analysis of a power spectrum of the first recording. Optionally, comparing characteristics of the first recording from the first user with characteristics of the reference voice recording of the first user to determine whether the first recording and the reference voice recording of the first user are from the same person further comprises using a voice template. Optionally, comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, the operations further comprising analyzing the first recording and determining an estimated state of inebriation of the first user. Optionally, the operations further comprising providing content related to obtaining consent to the first user and performing a text process to measure how successfully the first user consumed the content.

An aspect of the present disclosure relates to a system configured to process images, the system comprising: a computer device; non-transitory computer readable memory having program instructions stored thereon that when executed by the computer device cause the system to perform operations comprising: accessing a first plurality of images of a user captured using a camera; enhancing the first plurality of images by adjusting luminescence, contrast, and/or sharpness; locating a face in the first plurality of images using Haar cascades, a Histogram of Oriented Gradients, a Viola-Jones framework, and/or a first deep learning algorithm; locating first and second eyes in the face using a plurality of located facial landmarks and/or a convolutional neural network; locating respective pupils in the located first and second eyes; using optical flow and/or a second deep learning algorithm to determine movements of at least the first eye; detecting eye jerking of at least the first eye over two or more images in the first plurality of images based at least in part on the determined movements of the first eye; determining a distance of the detected eye jerking of the first eye and how long the detected eye jerking lasted; based at least in part on the determined distance of the detected eye jerking of the first eye and how long the detected eye jerking lasted, generating a first intoxication indicator; determining a size of a first pupil in one or more of the first plurality of images using a number of pixels in a line defining a diameter of the first pupil; based at least in part on the determined size of the first pupil, generating a second intoxication indicator; detecting, in the first plurality of images, eye blinking of at least the first eye using positions of one or more eye landmarks and/or using changes in pixel intensities over time; determining an eye blink rate of at least the first eye based at least in part on the detected eye blinking; using the determined eye blink rate of the first eye, generating a third intoxication indicator; using the first intoxication indicator, the second intoxication indicator, and the third intoxication indicator, determining whether the user has a capacity to consent to a first act; and at least partly in response to determining that the user lacks the capacity to consent to the first act, causing one or more messages to be generated and transmitted to one or more respective electronic destinations.

Optionally, the second intoxication indicator, and the third intoxication indicator are weighted differently in determining whether the user has the capacity to consent to the first act. Optionally, determining the distance of the detected eye jerking of the first eye and how long the detected eye jerking lasted, further comprises determining whether the user has nystagmus. Optionally, the system is configured to detect whether the user is smoothly moving the camera, while at least a portion of the first plurality of images are captured, using acceleration data from a three axis accelerometer associated with the camera, and at least partly in response to detecting that acceleration varies by more than a threshold amount, determine that the camera is not being smoothly moved by the user and generating a first message. Optionally, using the first intoxication indicator, the second intoxication indicator, and the third intoxication indicator, in determining whether the user has the capacity to consent to the first act, further comprises using an analysis of a voice recording from the user in determining whether the user has the capacity to consent to the first act. Optionally, system is configured to enable instructions to the user to hold the camera in a left hand facing the user, position the camera at eye level, move the camera from far left of the user's face to directly in front of the user's face, and to hold the camera in a right hand facing the user, position the camera at eye level, move the camera from far right of the user's face to directly in front of the user's face, wherein at least a portion of the first plurality of images are captured during such movements.

An aspect of the present disclosure related to a computer implemented method, the method comprising: accessing from memory a first plurality of images of a user captured using a camera, at least a portion of the first plurality of images captured while the camera was being between a side of the user's face to a front of the user's face; locating the face in the first plurality of images using Haar cascades, a Histogram of Oriented Gradients, a Viola-Jones framework, and/or a first deep learning algorithm; locating at least a first eye in the face using a plurality of located facial landmarks and/or a convolutional neural network; locating a pupil in the first eye; determining movements of the first eye in the first plurality of images; detecting eye jerking of at least the first eye over two or more images in the first plurality of images based at least in part on the determined movements of the first eye; determining a distance of the detected eye jerking of the first eye and how long the detected eye jerking lasted; based at least in part on the determined distance of the detected eye jerking of the first eye and how long the detected eye jerking lasted, generating a first intoxication indicator; using the first intoxication indicator, determining whether the user has a capacity to consent to a first act; and at least partly in response to determining that the user lacks the capacity to consent to the first act, causing one or more messages to be generated and transmitted to one or more respective electronic destinations.

Optionally, the method further comprising: determining a diameter of the pupil of the first eye in one or more of the first plurality of images using a number of pixels in a line defining a diameter of the pupil of the first eye; and wherein using the first intoxication indicator in determining whether the user has the capacity to consent to the first act, further comprises using the determined diameter of the pupil in determining whether the user has the capacity to consent to the first act. Optionally, the method further comprising: detecting, in the first plurality of images, eye blinking of the first eye using positions of one or more eye landmarks and/or using changes in pixel intensities over time; determining an eye blink rate of at least the first eye based at least in part on the detected eye blinking, wherein using the first intoxication indicator in determining whether the user has the capacity to consent to the first act, further comprises using the determined eye blink rate in determining whether the user has the capacity to consent to the first act. Optionally, the method further comprising: analyzing a voice recording of the user; and wherein using the first intoxication indicator in determining whether the user has the capacity to consent to the first act, further comprises using the analysis of the voice recording of the user in determining whether the user has the capacity to consent to the first act. Optionally, determining the distance of the detected eye jerking of the first eye and how long the detected eye jerking lasted, further comprises determining whether the user has nystagmus. Optionally, the method further comprising; detecting whether the user is smoothly moving the camera while at least a portion of the first plurality of images is captured using acceleration data from a three axis accelerometer associated with the camera; and at least partly in response to detecting that acceleration varies by more than a threshold amount: determining that the camera is not being smoothly moved by the user; and generate a first message. Optionally, the method further comprising electronically causing instructions to be audibly provided to the user to hold the camera in a left hand facing the user, position the camera at eye level, move the camera from far left of the user's face to directly in front of the user's face, and to hold the camera in a right hand facing the user, position the camera at eye level, move the camera from far right of the user's face to directly in front of the user's face, wherein at least a portion of the first plurality of images are captured during such camera movements.

An aspect of the present disclosure relates to a non-transitory computer readable memory having program instructions stored thereon that when executed by a computing device cause the computing device to perform operations comprising: accessing from memory a first plurality of images of a user captured using a camera, at least a portion of the first plurality of images captured while the camera was being moved in space between a side of the user's face to a front of the user's face; locating the face in the first plurality of images using Haar cascades, a Histogram of Oriented Gradients, a Viola-Jones framework, and/or a first deep learning algorithm; locating at least a first eye in the face using a plurality of located facial landmarks and/or a convolutional neural network; locating a pupil in the first eye; determining movements of the first eye; detecting eye jerking of at least the first eye over two or more images in the first plurality of images based at least in part on the determined movements of the first eye; determining a distance of the detected eye jerking of the first eye and how long the detected eye jerking lasted; based at least in part on the determined distance of the detected eye jerking of the first eye and how long the detected eye jerking lasted, generating a first intoxication indicator; using the first intoxication indicator, determining whether the user has a capacity to consent to a first act; and at least partly in response to determining that the user lacks the capacity to consent to the first act, causing one or more messages to be generated and transmitted to one or more respective electronic destinations.

Optionally, the operations further comprising: determining a diameter of the pupil of the first eye using a number of pixels in a line defining a diameter of the pupil of the first eye, wherein using the first intoxication indicator in determining whether the user has the capacity to consent to the first act, further comprises using the determined diameter of the pupil of the first eye in determining whether the user has the capacity to consent to the first act. Optionally, the operations further comprising: detecting, in the first plurality of images, eye blinking of the first eye using positions of one or more eye landmarks and/or using changes in pixel intensities over time; and determining an eye blink rate of at least the first eye based at least in part on the detected eye blinking, wherein using the first intoxication indicator in determining whether the user has the capacity to consent to the first act, further comprises using the determined eye blink rate in determining whether the user has the capacity to consent to the first act. Optionally, the operations further comprising: analyzing a voice recording of the user, wherein using the first intoxication indicator in determining whether the user has the capacity to consent to the first act, further comprises using the analysis of the voice recording of the user in determining whether the user has the capacity to consent to the first act. Optionally, determining the distance of the detected eye jerking of the first eye and how long the detected eye jerking lasted, further comprises determining whether the user has nystagmus. Optionally, the operations further comprising; detecting whether the user is smoothly moving the camera while at least a portion of the first plurality of images are captured using acceleration data from a three axis accelerometer associated with the camera; and at least partly in response to detecting that acceleration varies by more than a threshold amount, determine that the camera is not being smoothly moved by the user and generate a first message. Optionally, the operations further comprising electronically causing instructions to be audibly presented to the user to hold the camera in a left hand facing the user, position the camera at eye level, move the camera from far left of the user's face to directly in front of the user's face, and to hold the camera in a right hand facing the user, position the camera at eye level, move the camera from far right of the user's face to directly in front of the user's face, wherein at least a portion of the first plurality of images are captured while the camera is being moved.

Thus, as described herein, systems and methods are disclosed that overcome the technical problems related to performing user verification, while reducing the amount of memory and processing power needed to provide such verification.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to process voice recordings and to perform voice authentication, the system comprising:
   a computer device;
   a network interface; and
   non-transitory computer readable memory having program instructions stored thereon that when executed by the computer device cause the system to perform operations comprising:
      receiving, over the network via the network interface, a recording comprising a reference voice recording from a first user during an enrollment process;
      storing the reference voice recording from the first user in memory;
      receiving over the network via the network interface, a first consent validation request from the first user;
      generating a unique validation code;
      transmitting, over the network via the network interface, the unique validation code to at least a first destination associated with the first user;
      determining if the unique validation code was received from the first user and a second user within a first threshold period of time;
      at least partly in response to determining that the unique validation code was received from the first user and the second user within the first threshold period of time, enabling the first user to record the first user reading a first script and the second user to record the second user reading a second script;
      receiving a first voice recording from the first user;
      receiving a second voice recording from the second user;
      comparing characteristics of the first voice recording from the first user with characteristics of the stored reference voice recording of the first user to determine whether the first voice recording and the stored reference voice recording of the first user are from a same person and determining via an analysis of the first voice recording whether the first voice recording indicates that the first user is intellectually competent to provide a first consent to a first action, wherein analysis of the first voice recording comprises analyzing tone variations, tenor, and physiological components;
      comparing characteristics of the second voice recording from the second user with characteristics of a stored reference voice recording of the second user to determine whether the second voice recording and the stored reference voice recording of the second user are from the same person and determining via an analysis of the second voice recording whether the second voice recording indicates that the second user is intellectually competent to provide a second consent to the first action, wherein analysis of the second voice recording comprises analyzing tone variations, tenor, and physiological components;
      at least partly in response to determining that:
      the first voice recording and the stored reference voice recording of the first user are from the same person and that the first user is intellectually competent to provide the first consent to the first action, and
      the second voice recording and the stored reference voice recording of the second user are from the same person and that the second user is intellectually competent to provide the second consent to the first action,
      generating a consent verification indication;
      transmitting, over the network via the network interface, to at least one destination associated with the first user, a communication providing the consent verification indication; and
      transmitting, over the network via the network interface, to at least one destination associated with the second user, a communication providing the consent verification indication.

2. The system as defined in claim 1, wherein:
   the analysis of the first voice recording further comprises performing an analysis of a power spectrum of the first voice recording;
   comparing characteristics of the first voice recording from the first user with characteristics of the stored reference voice recording of the first user to determine whether the first voice recording and the stored reference voice recording of the first user are from the same person further comprises using a voice template; and
   comparing characteristics of the first voice recording from the first user with characteristics of the stored reference voice recording of the first user to determine whether the first voice recording and the stored reference voice recording of the first user are from the same person further comprises performing liveness detection to determine whether the first voice recording is from a live person or was from a speaker transducer.

3. The system as defined in claim 1, wherein the analysis of the first voice recording further comprises performing an analysis of a power spectrum of the first voice recording.

4. The system as defined in claim 1, wherein comparing characteristics of the first voice recording from the first user with characteristics of the stored reference voice recording of the first user to determine whether the first voice recording and the stored reference voice recording of the first user are from the same person further comprises using a voice template.

5. The system as defined in claim 1, wherein comparing characteristics of the first voice recording from the first user with characteristics of the stored reference voice recording of the first user to determine whether the first voice recording and the stored reference voice recording of the first user are from the same person further comprises performing liveness detection to determine whether the first voice recording is from a live person or was from a speaker transducer.

6. The system as defined in claim 1, wherein the analysis of the first voice recording further comprises determining an estimated state of inebriation.

7. The system as defined in claim 1, the operations further comprising providing content related to obtaining consent to the first user and performing a text process to measure how successfully the first user consumed the content.

8. A computer implemented method configured to perform voice authentication, the method comprising:
receiving, at a computer system, a recording comprising a reference voice recording from a first user during an enrollment process;
receiving, at the computer system, a first consent validation request from the first user;
generating a validation code;
transmitting, using the computer system, the validation code to at least a first destination associated with the first user;
determining, using the computer system, if the validation code was received from the first user and a second user within a first threshold period of time;
at least partly in response to determining that the validation code was received from the first user and the second user within the first threshold period of time, enabling the first user to record the first user reading a first script and the second user to record the second user reading a second script;
receiving a first voice recording from the first user;
receiving a second voice recording from the second user;
comparing characteristics of the first voice recording from the first user with characteristics of the reference voice recording of the first user to determine whether the first voice recording and the reference voice recording of the first user are from a same person, and determining via an analysis of the first voice recording whether the first voice recording indicates that the first user is intellectually competent to provide a first consent to a first action, wherein analysis of the first voice recording comprises analyzing tone variations, tenor, and physiological components;
comparing characteristics of the second voice recording from the second user with characteristics of a reference voice recording of the second user to determine whether the second voice recording and the reference voice recording of the second user are from the same person, and determining via an analysis of the second voice recording whether the second voice recording indicates that the second user is intellectually competent to provide a second consent to the first action, wherein analysis of the second voice recording comprises analyzing tone variations, tenor, and physiological components;
at least partly in response to determining that:
the first voice recording and the reference voice recording of the first user are from the same person, and
the second voice recording and the reference voice recording of the second user are from the same person,
generating, using the computer system, a consent verification indication;
transmitting, using the computer system, to at least one destination associated with the first user, a communication providing the consent verification indication; and
transmitting to at least one destination associated with the second user, a communication providing the consent verification indication.

9. The method as defined in claim 8,
wherein:
the analysis of the first voice recording further comprises performing an analysis of a power spectrum of the first voice recording;
comparing characteristics of the first voice recording from the first user with characteristics of the reference voice recording of the first user to determine whether the first voice recording and the reference voice recording of the first user are from the same person further comprises using a voice template; and
comparing characteristics of the first voice recording from the first user with characteristics of the reference voice recording of the first user to determine whether the first voice recording and the reference voice recording of the first user are from the same person further comprises performing liveness detection to determine whether the first voice recording is from a live person or was from a speaker transducer.

10. The method as defined in claim 8,
wherein the analysis of the first voice recording further comprises performing an analysis of a power spectrum of the first voice recording.

11. The method as defined in claim 8, wherein comparing characteristics of the first voice recording from the first user with characteristics of the reference voice recording of the first user to determine whether the first voice recording and the reference voice recording of the first user are from the same person further comprises using a voice template.

12. The method as defined in claim 8, wherein comparing characteristics of the first voice recording from the first user with characteristics of the reference voice recording of the first user to determine whether the first voice recording and the reference voice recording of the first user are from the same person further comprises performing liveness detection to determine whether the first voice recording is from a live person or was from a speaker transducer.

13. The method as defined in claim 8, the method further comprising analyzing the first voice recording and determining an estimated state of inebriation of the first user.

14. The method as defined in claim 8, the method further comprising providing content related to obtaining consent to the first user and performing a text process to measure how successfully the first user consumed the content.

15. Non-transitory computer readable memory having program instructions stored thereon that when executed by a computing device cause the computing device to perform operations comprising:
receiving a recording comprising a reference voice recording from a first user during an enrollment process;
receiving a first consent validation request from the first user;
generating a unique validation code;
transmitting the unique validation code to at least a first destination associated with the first user;
determining if the unique validation code was received from the first user and a second user within a first threshold period of time;
at least partly in response to determining that the unique validation code was received from the first user and the second user within the first threshold period of time, enabling the first user to record the first user reading a first script and a second user to record the second user reading a second script;
receiving a first voice recording from the first user;
receiving a second voice recording from the second user;
comparing characteristics of the first voice recording from the first user with characteristics of the reference voice recording of the first user to determine whether the first voice recording and the reference voice recording of the first user are from a same person, and determining via an analysis of the first voice recording whether the first voice recording indicates that the first user is intellectually competent to provide a first consent to a first action, wherein analysis of the first voice recording comprises analyzing tone variations, tenor, and physiological components;
comparing characteristics of the second voice recording from the second user with characteristics of a reference voice recording of the second user to determine whether the second voice recording and the reference voice recording of the second user are from the same person, and determining via an analysis of the second voice recording whether the second voice recording indicates that the second user is intellectually competent to provide a second consent to the first action, wherein analysis of the second voice recording comprises analyzing tone variations, tenor, and physiological components;
at least partly in response to determining that:
the first voice recording and the reference voice recording of the first user are from the same person, and
the second voice recording and the reference voice recording of the second user are from the same person,
generating a consent verification indication;
transmitting to at least one destination associated with the first user, a communication providing the consent verification indication; and
transmitting to at least one destination associated with the second user, a communication providing the consent verification indication.

16. The non-transitory computer readable memory as defined in claim 15,
wherein:
the analysis of the first voice recording further comprises performing an analysis of a power spectrum of the first voice recording;
comparing characteristics of the first voice recording from the first user with characteristics of the reference voice recording of the first user to determine whether the first voice recording and the reference voice recording of the first user are from the same person further comprises using a voice template; and
comparing characteristics of the first voice recording from the first user with characteristics of the reference voice recording of the first user to determine whether the first voice recording and the reference voice recording of the first user are from the same person further comprises performing liveness detection to determine whether the first voice recording is from a live person or was from a speaker transducer.

17. The non-transitory computer readable memory as defined in claim 15,
wherein the analysis of the first voice recording further comprises performing an analysis of a power spectrum of the first voice recording.

18. The non-transitory computer readable memory as defined in claim 15, wherein comparing characteristics of the first voice recording from the first user with characteristics of the reference voice recording of the first user to determine whether the first voice recording and the reference voice recording of the first user are from the same person further comprises using a voice template.

19. The non-transitory computer readable memory as defined in claim 15, wherein comparing characteristics of the first voice recording from the first user with characteristics of the reference voice recording of the first user to determine whether the first voice recording and the reference voice recording of the first user are from the same person further comprises performing liveness detection to determine whether the first voice recording is from a live person or was from a speaker transducer.

20. The non-transitory computer readable memory as defined in claim 15, the operations further comprising analyzing the first voice recording and determining an estimated state of inebriation of the first user.

21. The non-transitory computer readable memory as defined in claim 15, the operations further comprising providing content related to obtaining consent to the first user and performing a text process to measure how successfully the first user consumed the content.

* * * * *